US009153075B2

United States Patent
Ueno et al.

(10) Patent No.: US 9,153,075 B2
(45) Date of Patent: Oct. 6, 2015

(54) DISPLAY DEVICE, CONTROL SYSTEM, AND STORAGE MEDIUM STORING CONTROL PROGRAM

(75) Inventors: Yasuhiro Ueno, Yokohama (JP); Shigeki Tanabe, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 755 days.

(21) Appl. No.: 13/544,123

(22) Filed: Jul. 9, 2012

(65) Prior Publication Data

US 2013/0016093 A1     Jan. 17, 2013

(30) Foreign Application Priority Data

Jul. 11, 2011   (JP) ................................. 2011-153176

(51) Int. Cl.
| | |
|---|---|
| *G06T 15/00* | (2011.01) |
| *G06T 19/20* | (2011.01) |
| *G06F 3/01* | (2006.01) |
| *A63F 13/40* | (2014.01) |
| *A63F 13/428* | (2014.01) |
| *H04N 13/04* | (2006.01) |

(52) U.S. Cl.
CPC ................. *G06T 19/20* (2013.01); *A63F 13/10* (2013.01); *A63F 13/428* (2014.09); *G06F 3/011* (2013.01); *A63F 2300/1087* (2013.01); *A63F 2300/204* (2013.01); *G06T 2219/2004* (2013.01); *G06T 2219/2016* (2013.01); *H04N 13/0497* (2013.01)

(58) Field of Classification Search
None
See application file for complete search history.

(56) References Cited

U.S. PATENT DOCUMENTS

| | | |
|---|---|---|
| 2008/0231926 A1 | 9/2008 | Klung et al. |
| 2011/0137156 A1* | 6/2011 | Razzaque et al. ............. 600/424 |
| 2014/0192172 A1* | 7/2014 | Kang et al. ...................... 348/55 |

FOREIGN PATENT DOCUMENTS

| | | |
|---|---|---|
| JP | 2005-31799 A | 2/2005 |
| JP | 2010-522380 A | 7/2010 |
| JP | 2011-095547 A | 5/2011 |
| JP | 2011-101677 A | 5/2011 |
| JP | 2011-108152 A | 6/2011 |

OTHER PUBLICATIONS

Office Action mailed Feb. 3, 2015, corresponding to Japanese patent application No. 2011-153176, for which an explanation of relevance is attached.
Kohji Kenjoh, Three-dimensional Tetris comes to Japan: Amazing cubic action puzzle "Blockout", My computer BASIC Magazine, Feb. 1, 1990, pp. 288-290, vol. 9, Issue 2, Denpa Shimbunsha, Japan.
Kenichiro Matsuura, PuzzleGame Algorithm Maniax, 1st edition, Jul. 31, 2008, pp. 123-138, pp. 223-225, SB Creative Corp., Japan.
Keijo, Tetris: The Grand Mastre, Gamest, Sep. 30, 1998, p. 46, vol. 13, Issue 25, Shinseisha, Japan,.

* cited by examiner

*Primary Examiner* — Sath V Perungavoor
*Assistant Examiner* — Janese Duley
(74) *Attorney, Agent, or Firm* — Lowe Hauptman & Ham, LLP

(57) ABSTRACT

According to an aspect, a display device includes a display unit, a control unit, and a detecting unit. The display unit stereoscopically displays a three-dimensional block in a three-dimensional space. A virtual play space in the three-dimensional space is sectioned in a three-dimensional matrix pattern, and the three-dimensional block occupies one or a plurality of sections obtained by sectioning. The detecting unit detects a position of an object in the three-dimensional space. The control unit controls the display unit to allow the three-dimensional block to appear. When a change with time in the object in the three-dimensional space is detected by the detecting unit, the control unit controls the display unit to allow the three-dimensional block to move in section unit based on a detection result.

20 Claims, 29 Drawing Sheets

FIG.9
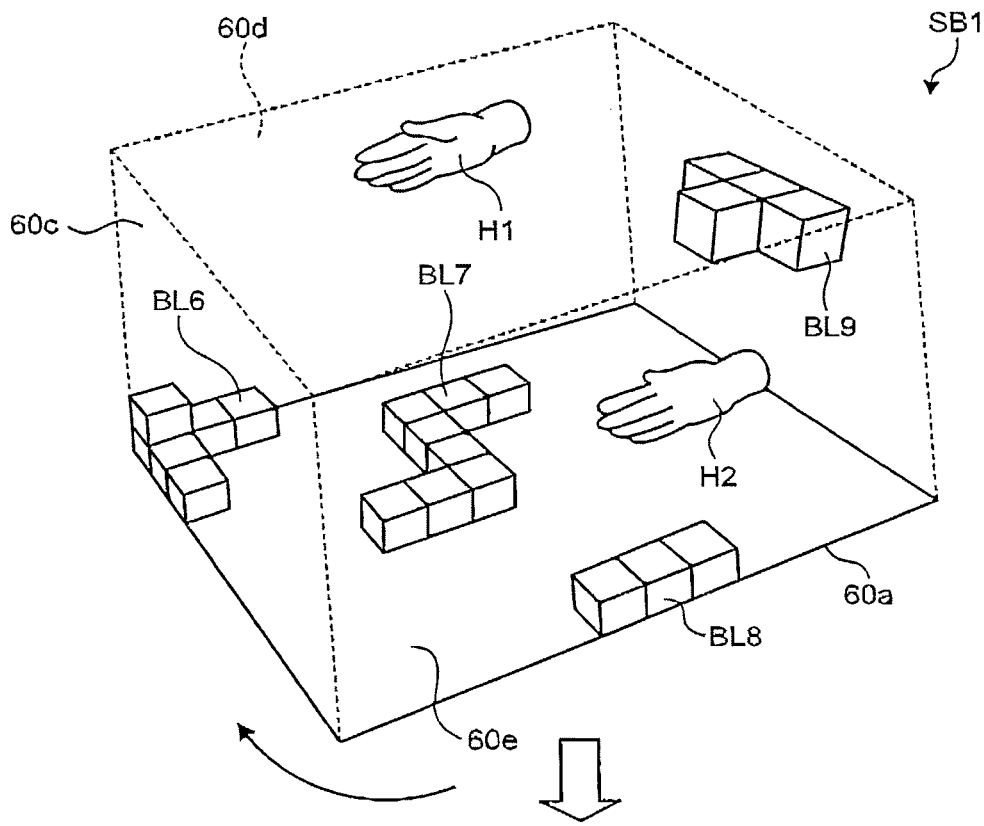
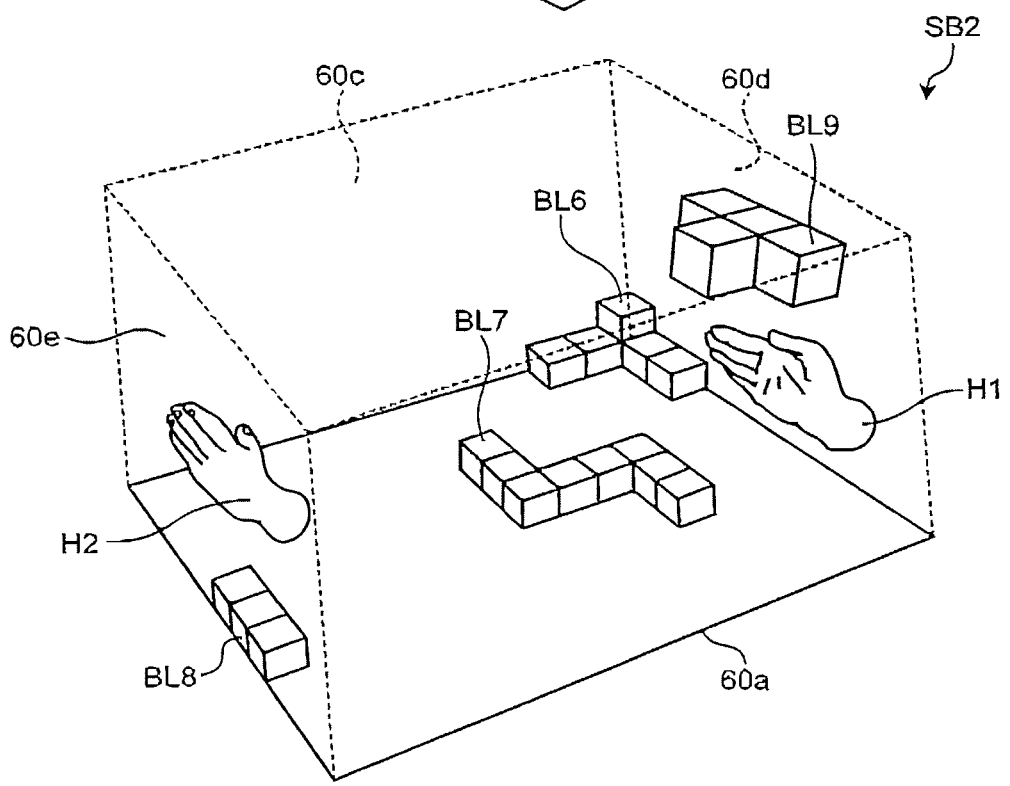

FIG.12
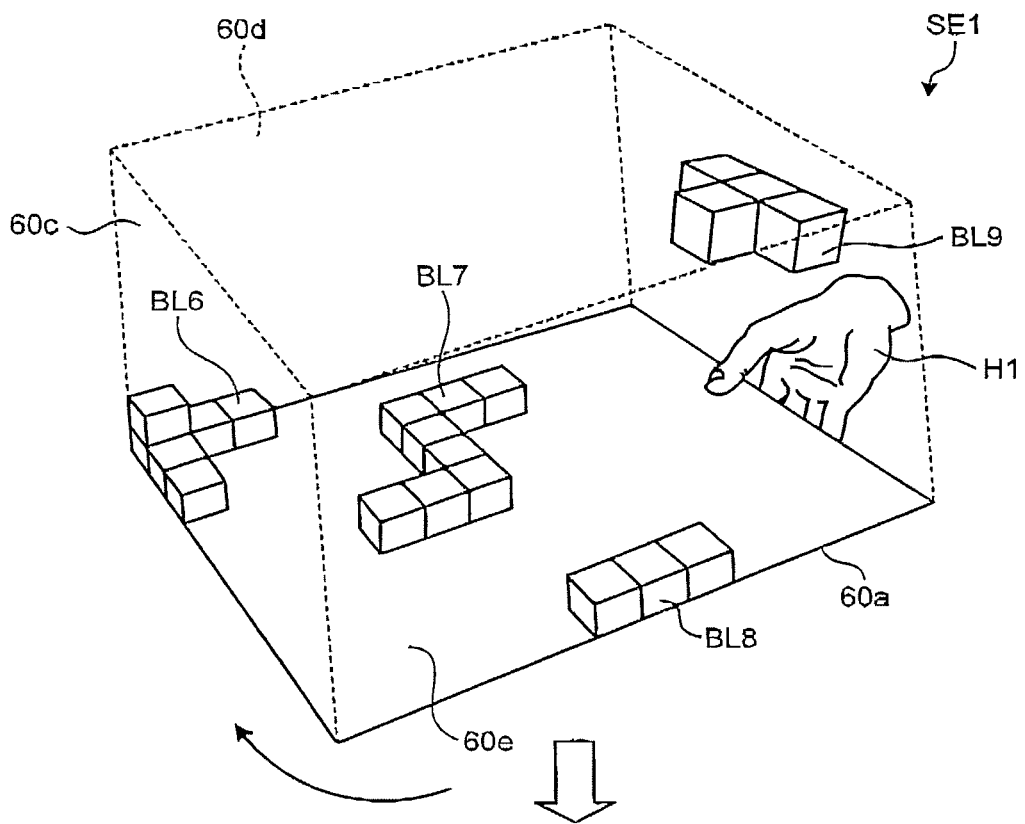
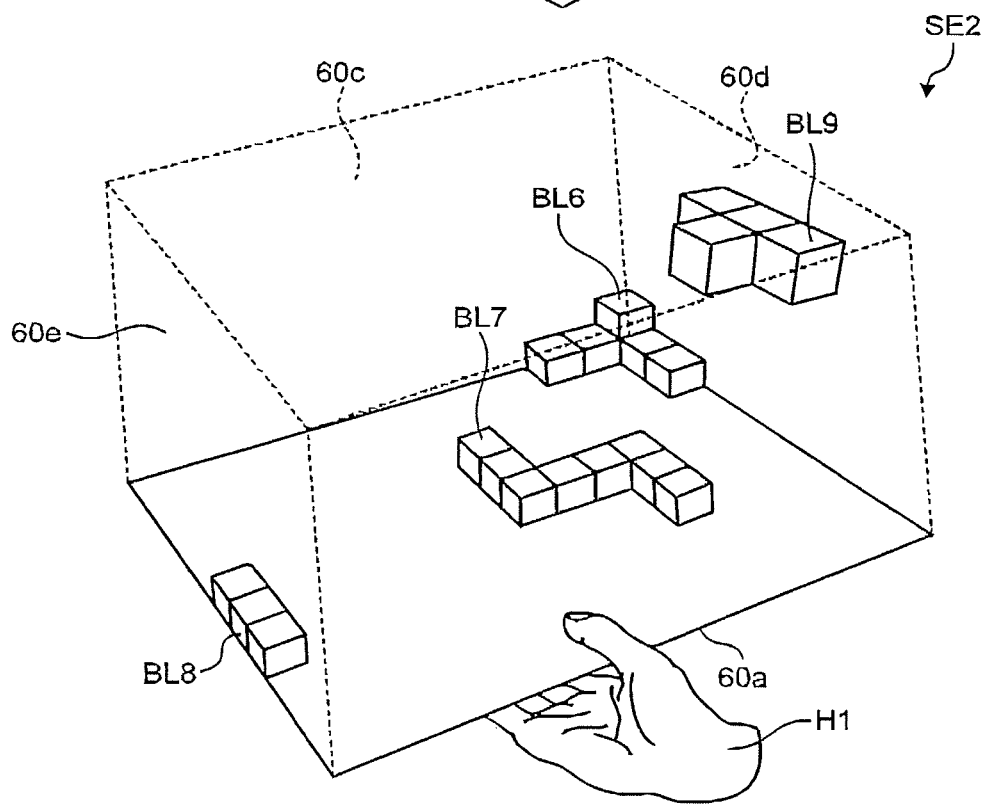

FIG.13
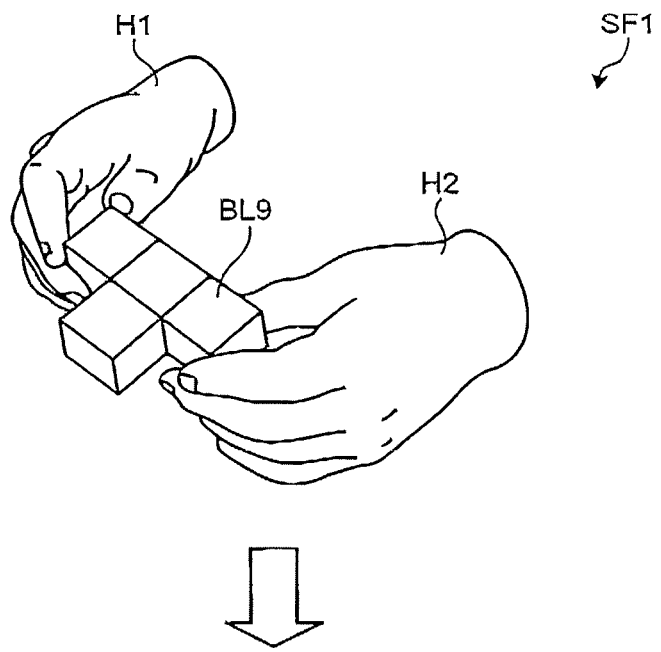
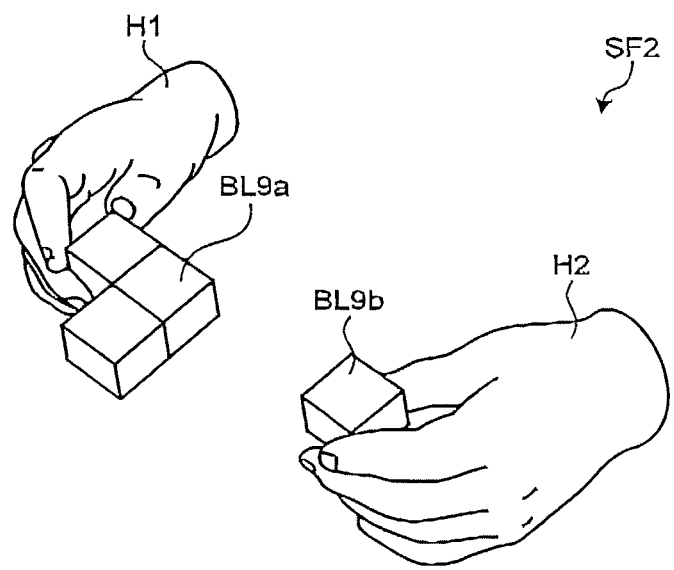

FIG.14
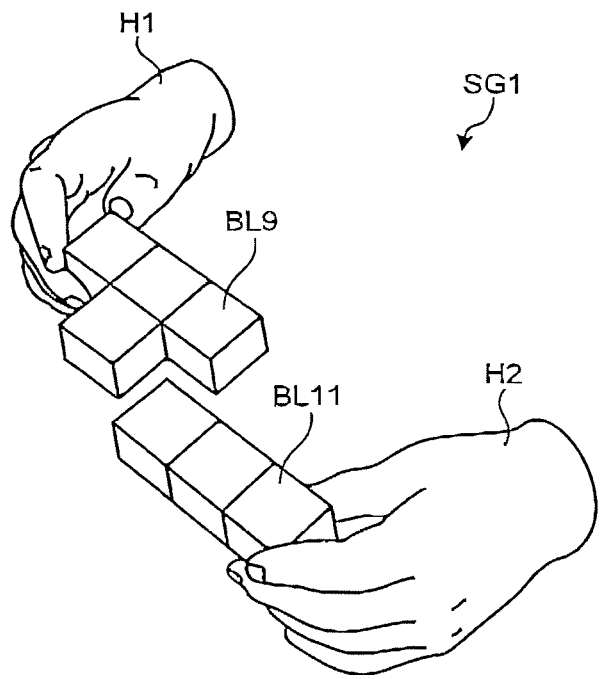
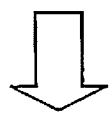
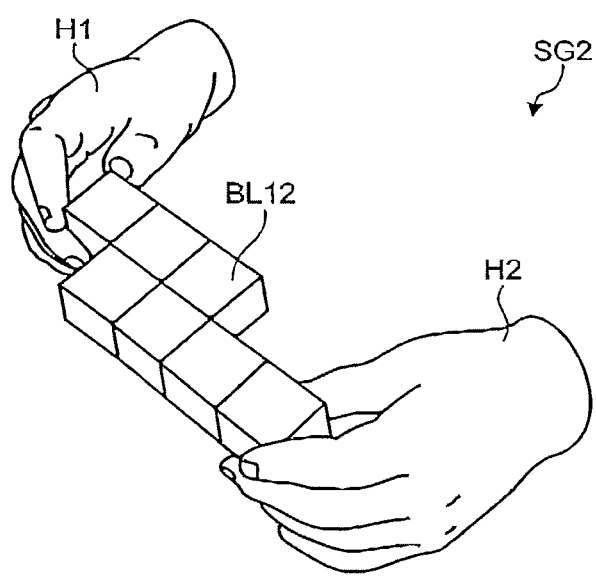

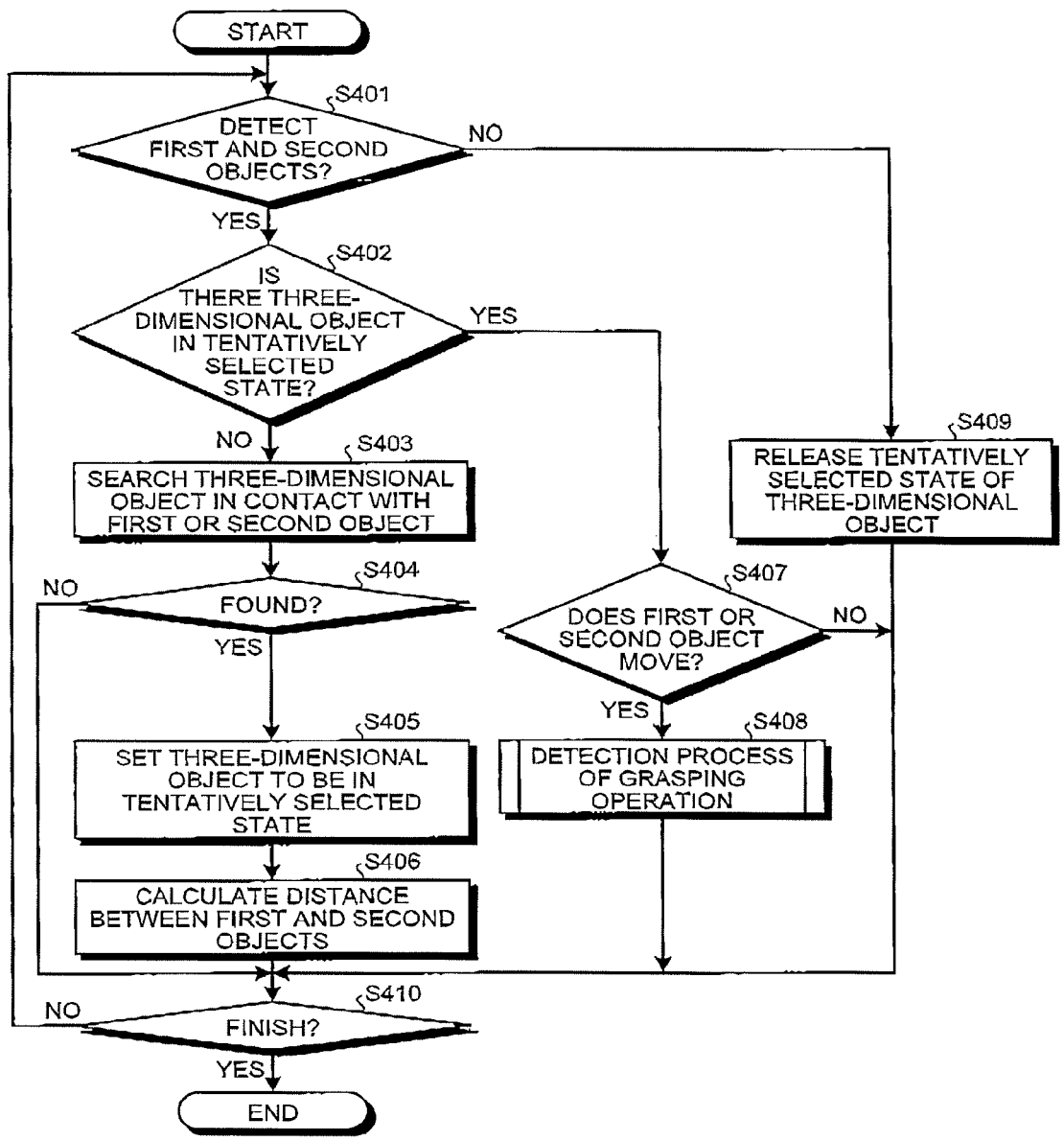

FIG.22

| Fulcrum | Obstacle | Pushed speed | Change |
|---|---|---|---|
| Not exist | Not exist | * | It is moved in the pushed direction according to the pushed amount. |
| | Stopped three-dimensional block or Surface of play space | * | It is moved in the pushed direction according to the pushed amount. It is not moved after coming in contact with the obstacle. |
| | Three-dimensional block in motion | Low | It is moved in the pushed direction according to the pushed amount. After coming in contact with the obstacle, it is moved together with the obstacle. |
| | | High | It is moved in the pushed direction according to the pushed amount. On contact with the obstacle, it flicks away the obstacle. |
| Exist | Not exist | * | It is rotated around the fulcrum. |

24c

DISPLAY DEVICE, CONTROL SYSTEM, AND STORAGE MEDIUM STORING CONTROL PROGRAM

CROSS-REFERENCE TO RELATED APPLICATIONS

This application claims priority from Japanese Application No. 2011-153176, filed on Jul. 11, 2011, the content of which is incorporated by reference herein in its entirety.

BACKGROUND OF THE INVENTION

1. Technical Field

The present disclosure relates to a display device, a control system, and a storage medium storing therein a control program.

2. Description of the Related Art

Some display devices such as mobile phones with a display unit can stereoscopically display an image and so on (see e.g., Japanese Patent Application Laid-open No. 2011-95547). The three-dimensional display is implemented by using binocular disparity.

Some gaming devices are configured to execute three-dimensional game applications. For example, the game device disclosed in Japanese Patent Application Laid-open No. 2011-101677 executes the three-dimensional game by using a stereoscopic puzzle displayed by three-dimensional computer graphics.

The three-dimensional display is a user-friendly display manner; however, it has been used just for viewing purposes, and has not been used for improving the convenience of operations. There are the three-dimensional game applications such as the stereoscopic puzzles; however, the above-mentioned gaming devices allow the user to select only specific one object by an operation button and the like, and further, it takes some time for him/her to adapt oneself to the operation.

For the foregoing reasons, there is a need for a display device, a control system, and a control program that can provide the user with convenient operations.

SUMMARY

According to an aspect, a display device includes a display unit, a control unit, and a detecting unit. The display unit stereoscopically displays a three-dimensional block in a three-dimensional space. A virtual play space in the three-dimensional space is sectioned in a three-dimensional matrix pattern, and the three-dimensional block occupies one or a plurality of sections obtained by sectioning. The detecting unit detects a position of an object in the three-dimensional space. The control unit controls the display unit to allow the three-dimensional block to appear. When a change with time in the object in the three-dimensional space is detected by the detecting unit, the control unit controls the display unit to allow the three-dimensional block to move in section unit based on a detection result. When all sections of one layer of the play space is filled with the moved three-dimensional block, the control unit controls the display unit to allow a portion of the three-dimensional block included in the layer to be deleted.

According to another aspect, a control system includes a terminal and a control unit. The terminal includes a display unit and a detecting unit. The display unit stereoscopically displays a three-dimensional block in a three-dimensional space. A virtual play space in the three-dimensional space is sectioned in a three-dimensional matrix pattern, and the three-dimensional block occupies one or a plurality of sections obtained by sectioning. The detecting unit detects a position of an object in the three-dimensional space. The control unit controls the display unit to allow the three-dimensional block to appear. When a change with time in the object in the three-dimensional space is detected by the detecting unit, the control unit controls the display unit to allow the three-dimensional block to move in section unit based on a detection result. When all sections of one layer of the play space is filled with the moved three-dimensional block, the control unit controls the display unit to allow a portion of the three-dimensional block included in the layer to be deleted.

According to another aspect, a non-transitory storage medium stores a control program. When executed by a display device including a display unit and a detecting unit, the control program causes the display device to execute: stereoscopically displaying, in a virtual play space sectioned in a three-dimensional matrix pattern in a three-dimensional space, a three-dimensional block occupying one or a plurality of sections obtained by sectioning by the display unit; detecting a position of an object in the three-dimensional space by the detecting unit; moving three three-dimensional block in section unit when a change with time in the object in the three-dimensional space is detected by the detecting unit; and deleting a portion of the three-dimensional block included in one layer when all sections of the one layer of the play space are filled with the moved three-dimensional block.

BRIEF DESCRIPTION OF THE DRAWINGS

FIG. 9 is a diagram illustrating an example of operation to handle the play space as a three-dimensional object;
FIG. 12 is a diagram illustrating an example of operation to handle a surface of the play space as a three-dimensional object;
FIG. 13 is a diagram illustrating an example of operation of disassembling a three-dimensional block;
FIG. 14 is a diagram illustrating an example of operation of combining three-dimensional blocks.

FIG. 21 is a flowchart illustrating a procedure of a detection process of selection when contact with a three-dimensional object is added to conditions of the selection;

FIG. 22 is a diagram illustrating an example of information stored in action data;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
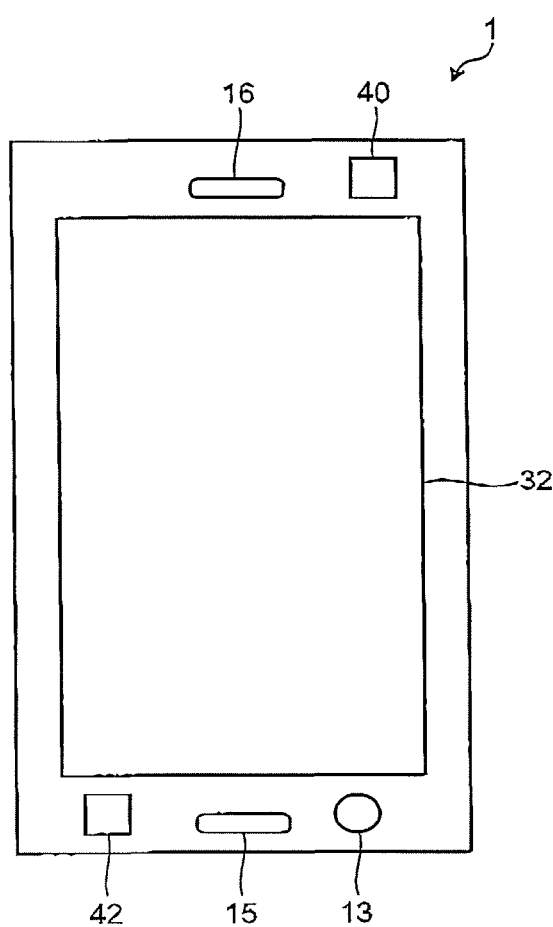
FIG. 1 is a front view of a mobile phone.
Figure 2:
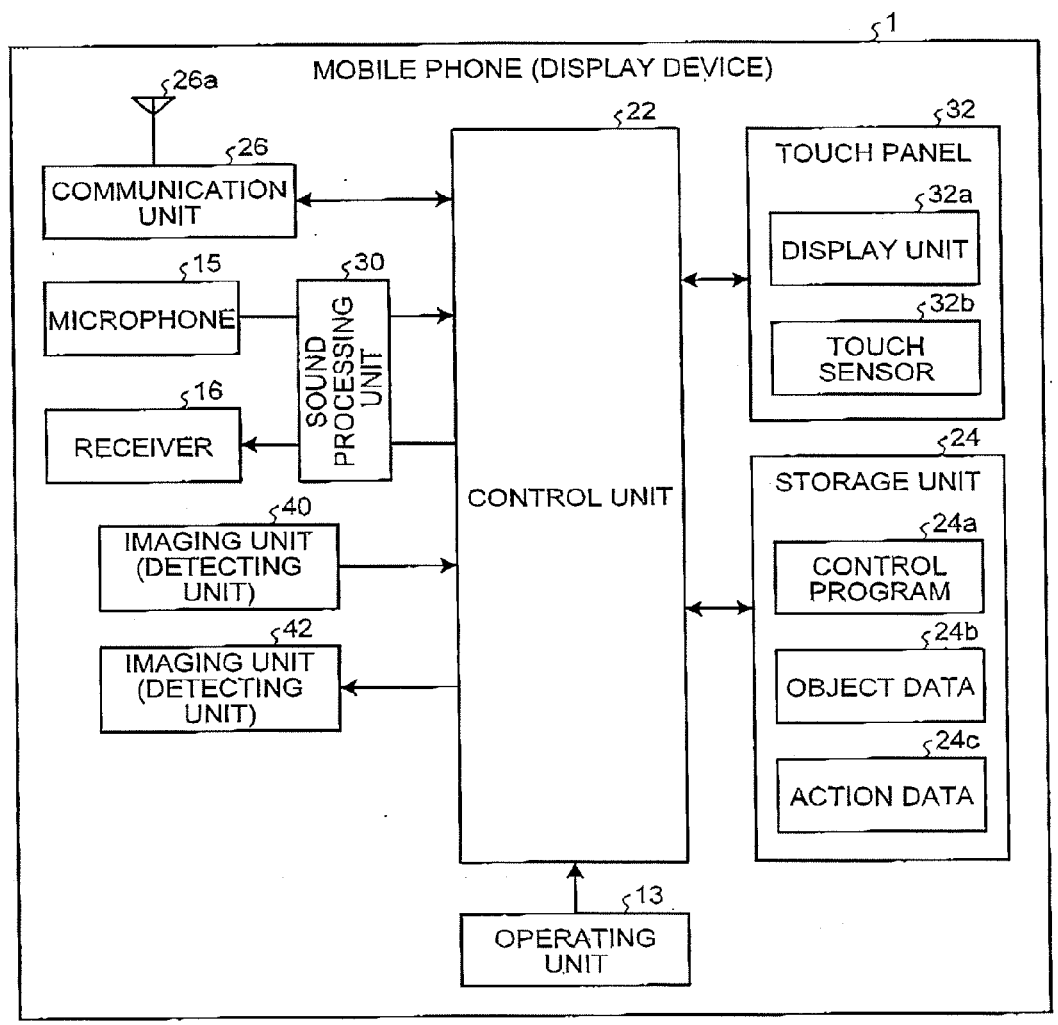
FIG. 2 is a block diagram of the mobile phone.

First of all, a configuration of a mobile phone (display device) 1 according to a first embodiment is described with reference to FIGS. 1 and 2. FIG. 1 is a front view of the mobile phone 1. FIG. 2 is a block diagram of the mobile phone 1.

As illustrated in FIGS. 1 and 2, the mobile phone 1 includes an operating unit 13, a microphone 15, a receiver 16, a control unit 22, a storage unit 24, a communication unit 26, a sound processing unit 30, a touch panel 32, and imaging units 40 and 42. A part of the operating unit 13, the microphone 15, the receiver 16, the touch panel 32, and the imaging units 40 and 42 is exposed on a front surface of the mobile phone 1, respectively.

The operating unit 13 includes a physical button, and outputs a signal corresponding to the button, which is pressed down, to the control unit 22. Although the operating unit 13 includes only one button in an example illustrated in FIG. 1, the operating unit 13 may include a plurality of buttons.

The microphone 15 obtains an external voice. The receiver 16 outputs a voice of a party during a call. The sound processing unit 30 converts the voice input from the microphone 15 to a digital signal and outputs the signal to the control unit 22. The sound processing unit 30 decodes the digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NEC (Near Field Communication) may also be included in lieu of or in addition to the communication unit 26.

The touch panel 32 displays various pieces of information such as a character, a figure, and an image, and detects input operation on a predetermined region such as an icon, a button, and a character input region displayed. The touch panel 32 includes a display unit 32a and a touch sensor 32b overlapped with each other.

The display unit 32a is provided with a display device such as a liquid crystal display (LCD) and an organic electro-luminescence display (OELD), and displays the various pieces of information according to a control signal input from the control unit 22. The touch sensor 32b detects the input operation performed on a surface of the touch panel 32, and outputs the signal according to the detected input operation to the control unit 22. The detection method in which the touch sensor 32b detects various operations may be any detection method, such as a capacitive type detection method, a resistive type detection method, and a pressure sensitive type detection method.

The touch panel 32 can display a three-dimensional object. A "three-dimensional object" is a display object such as an image and a shape created so as to look as if the display object is three-dimensional using disparity. The method of displaying the three-dimensional object may be a method of realizing a stereoscopic vision using a tool such as glasses, or may be a method of realizing a stereoscopic vision with the naked eye.

Each of the imaging units 40 and 42 electronically takes an image by using an image sensor such as a CCD (charge coupled device image sensor) and a CMOS (complementary metal oxide semiconductor). Each of the imaging units 40 and 42 converts the taken image to the signal to output to the control unit 22. The imaging units 40 and 42 also serve as detecting units, which detect an object operating the three-dimensional object, in a space in which the three-dimensional object is stereoscopically displayed (hereinafter, also referred to "three-dimensional space", "stereoscopic vision space" or "visual space").

A field angle and arrangement of each of the imaging units 40 and 42 are set such that the image of the object such as a finger may be taken irrespective of a position of the object in the three-dimensional space. The imaging units 40 and 42 may be devices, which obtain the image of visible light, and the devices, which obtain the image of non-visible light such as infrared light.

The control unit 22 is provided with a CPU (central processing unit), which is a processing unit, and memory, which is a storage unit, and realizes various functions by executing program(s) by using these hardware resources. Specifically, the control unit 22 reads the program and data stored in the storage unit 24, loads them into the memory, and allows the CPU to execute instructions included in the program loaded into the memory. The control unit 22 reads and writes the data from and to the memory and the storage unit 24, and controls operation of the communication unit 26, the display unit 32a and the like according to an execution result of the instruction by the CPU. When the CPU executes the instruction, the data loaded into the memory and the signal input from the touch sensor 32b and the like are utilized as a part of a parameter and a judgment condition.

The storage unit 24 includes one or more non-transitory storage medium, for example, a nonvolatile memory (such as ROM, EPROM, flash card etc.) and/oz a storage device (such as magnetic storage device, optical storage device, solid-state storage device etc.), and stores therein various programs and data. Examples of the programs stored in the storage unit 24 include a control program 24a. Examples of the data stored in the storage unit 24 include object data 24b and action data 24c. The storage unit 24 may include a combination of a portable storage medium such as a memory card and a reading/writing device, which reads and writes from and to the storage medium. In this case, the control program 24a, the object data 24b, and the action data 24c may be stored in the storage medium. It is also possible to obtain the control program 24a, the object data 24b, and the action data 24c from another device such as a server through communication by the communication unit 26.

The control program 24a provides a function about various pieces of control for allowing the mobile phone 1 to operate. Examples of the function provided by the control program 24a includes the function to control the display of the three-dimensional object by the touch panel 32 and the function to detect operation of a user for the three-dimensional object displayed by the touch panel 32. The control program 24a controls the display of the three-dimensional object and detects the operation for the three-dimensional object in this manner, thereby allowing the user to enjoy a three-dimensional game in the three-dimensional space as described later.

The object data 24b includes information about the shape and a property of the three-dimensional object. The object data 24b is used for displaying the three-dimensional object. The action data 24c includes information about how the operation for the displayed three-dimensional object acts on the three-dimensional object. The action data 24c is used for changing the three-dimensional object when the operation for the displayed three-dimensional object is detected. The term "changing" herein includes "moving", "rotating", "deforming", "erasing" and the like.

Figure 3:
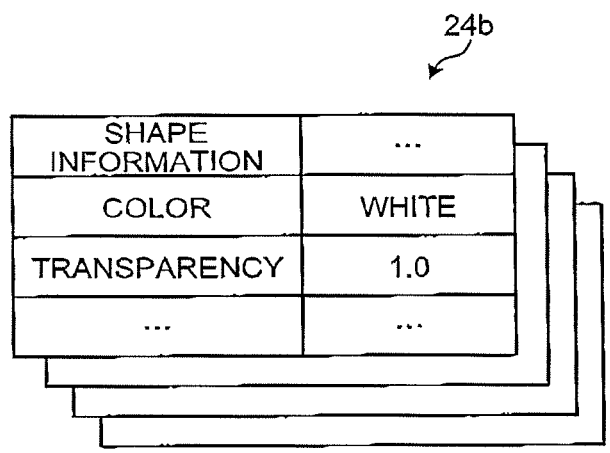
FIG. 3 is a diagram illustrating an example of information stored in object data.

FIG. 3 is a diagram illustrating an example of the information stored in the object data 24b. As illustrated in FIG. 3, the information including shape information, color, transparency and the like is stored for each three-dimensional object in the object data 24b. The shape information is the information indicating the shape of the three-dimensional object. The shape information is a set of coordinates of apices of surfaces, which compose the three-dimensional object, for example. The color is the color of the surface of the three-dimensional object. The transparency is a degree of transmission of light of the three-dimensional object. The object data 24b may maintain the information about a plurality of three-dimensional objects.

Figure 4:
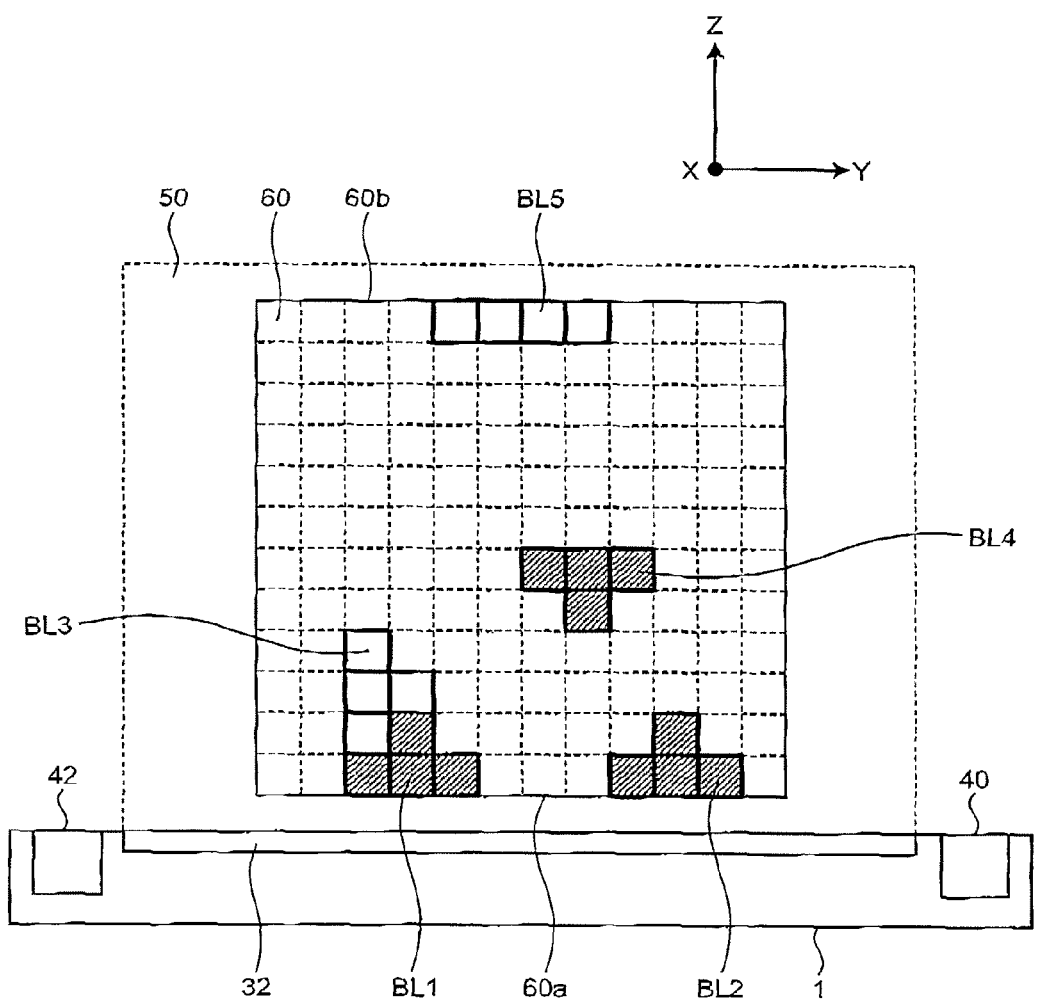
FIG. 4 is a schematic diagram illustrating an example of display of a three-dimensional object by the mobile phone.

Then, the control of the display of the three-dimensional object and the detection of the operation for the three-dimensional object by the mobile phone 1 are described with reference to FIGS. 4 to 14. FIG. 4 is a schematic diagram illustrating an example of the display of the three-dimensional object by the mobile phone 1. The three-dimensional object is stereoscopically displayed when the touch panel 32 of the mobile phone 1 is seen from a specific direction; however, the three-dimensional object may not be stereoscopically displayed as illustrated in FIG. 4 when the touch panel 32 is seen from the side. FIG. 4 illustrates the mobile phone 1 as a simple cross-sectional view seen from the side.

As illustrated in FIG. 4, the mobile phone 1 sets a play space 60 in a three-dimensional space 50. The play space 60 is a virtual space having a cube shape sectioned in a three-dimensional matrix pattern. Each section obtained by sectioning the play space 60 has the cube shape. Although the sections obtained by sectioning the play space 60 are indicated by a broken line for convenience of description in FIG. 4, each section is not necessarily clearly indicated in this manner.

The mobile phone 1 moves a three-dimensional block from a top surface 60b, which is one of surfaces of the play space 60, toward a bottom surface 60a opposed to the top surface 60b. The three-dimensional block is the three-dimensional object, which occupies one or a plurality of sections obtained by sectioning the play space 60. There is a plurality of types of three-dimensional blocks and the shape and the color are different for each type. The shape and the color of each type are defined by the object data 24b.

The mobile phone 1 allows the three-dimensional block to appear in the vicinity of the top surface 60b and thereafter moves the three-dimensional block toward the bottom surface 60a with time. When any of the surfaces in a moving direction of the three-dimensional block (surface opposed to the bottom surface 60a) is brought into contact with the bottom surface 60a, the mobile phone 1 stops moving the three-dimensional block and sets the three-dimensional block to be in a stopped state. The mobile phone 1 sets the three-dimensional block to be in the stopped state also when any of the surfaces in the moving direction of the three-dimensional block is brought into contact with another three-dimensional block in the stopped state.

A predetermined time period after the mobile phone 1 allows one three-dimensional block to appear, the mobile phone 1 allows a next three-dimensional block to appear. The next three-dimensional block might appear during movement of a previous three-dimensional block. The mobile phone 1 gradually shortens an interval between each appearance of the three-dimensional block in order to improve the entertainment of the game. The mobile phone 1 may also gradually increase a speed at which the three-dimensional block is moved toward the bottom surface 60a in order to improve the entertainment of the game.

As a result of continuous appearance of the three-dimensional block, a plurality of blocks are stacked in the play space 60. For example, in the example illustrated in FIG. 4, three-dimensional blocks BL1 and BL2 reach the bottom surface 60a and are in the stopped state. A three-dimensional block BL3 is stacked on the three-dimensional block BL1 and is in the stopped state. A three-dimensional block BL4 is in motion and a three-dimensional block BL5 appears in the vicinity of the top surface 60b.

When the three-dimensional blocks are stacked so that any layer of the play space 60 is filled with elements of the three-dimensional block, the mobile phone 1 deletes the layer.

Figure 5:
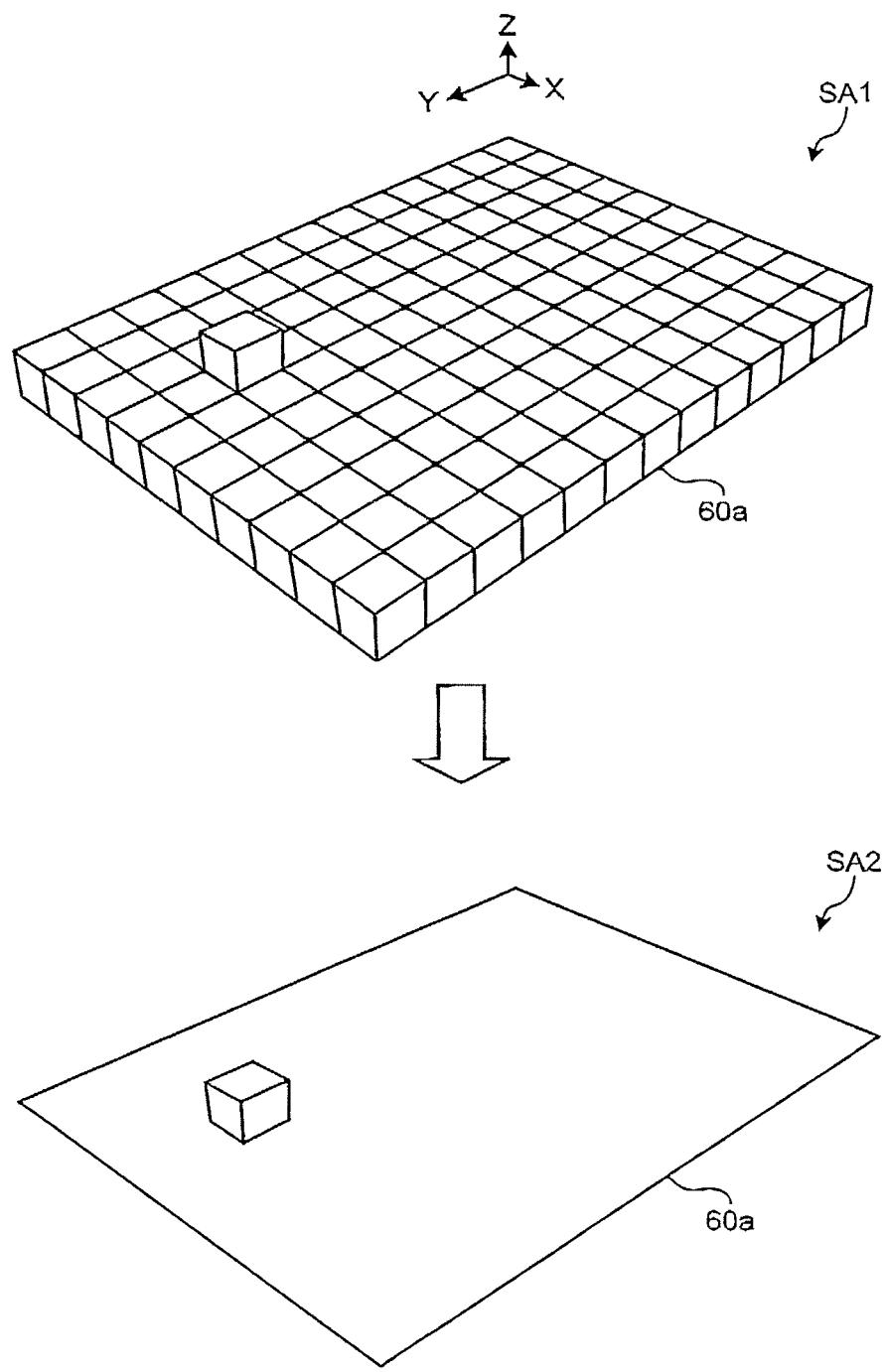
FIG. 5 is a diagram illustrating an example of deleting a layer.

FIG. 5 is a diagram illustrating an example of deleting the layer. At Step SA1 illustrated in FIG. 5, a portion above the bottom surface 60a is filled with the elements of the three-dimensional block. When one layer is filled in this manner, the mobile phone 1 deletes the filled layer as illustrated at Step SA2. Then, the mobile phone 1 moves a portion located above the filled layer of a remaining part of the three-dimensional block, which composes the filled layer, toward the bottom surface 60a until any of the surfaces opposed to the bottom surface 60a is brought into contact with the bottom surface 60a or another three-dimensional block in the stopped state. Although the bottom surface 60a is visibly displayed in FIG. 5, the bottom surface 60a is not necessarily displayed.

The mobile phone 1 adds a point to a user's score each time the filled layer is deleted. The mobile phone 1 adds more points than usual to the user's score when, by the movement of the remaining part of the three-dimensional block in association with the deletion of the filled layer, another layer is deleted (when so-called linkage occurs). The mobile phone 1 finishes the above-described control when the three-dimensional blocks are stacked so that it becomes impossible to allow the new three-dimensional block to appear.

The user may enjoy the game intended to obtain as high score as possible by utilizing such control by the mobile phone 1. The user may operate the three-dimensional block in motion for increasing the score. Specifically, the user may move and rotate the three-dimensional block in motion with a hand and the finger.

The mobile phone 1 determines a position and operation of the object such as the hand present in the three-dimensional space based on the images taken by the imaging units 40 and 42. The mobile phone 1 detects the operation for the three-dimensional object by checking the determined position and operation of the object against the shape and a calculated position of the three-dimensional object such as the three-dimensional block displayed in the three-dimensional space.

The position of the object may also be determined based on a size of the object registered in advance and the size and the position of the object in the image. Alternatively, the position of the object may be determined by checking the size and the position of the object in the image taken by the imaging unit 40 against the size and the position of the object in the image taken by the imaging unit 42. Determination of the operation of the object such as the finger may be realized by using known technology. When the object is the finger, a position of a fingertip may be processed as the position of the object.

The shape of the three-dimensional object is defined by the object data 24b. The calculated position of the three-dimensional object in the three-dimensional space is calculated based on the position of the three-dimensional object on a display surface of the touch panel 32 and a floating amount of the three-dimensional object in the three-dimensional space. The floating amount of the three-dimensional object in the three-dimensional space may be a value decided at the time of display or a value calculated from difference between the position of the three-dimensional object in the image for the right eye and that in the image for the left eye used for stereoscopically displaying the three-dimensional object.

Figure 6:
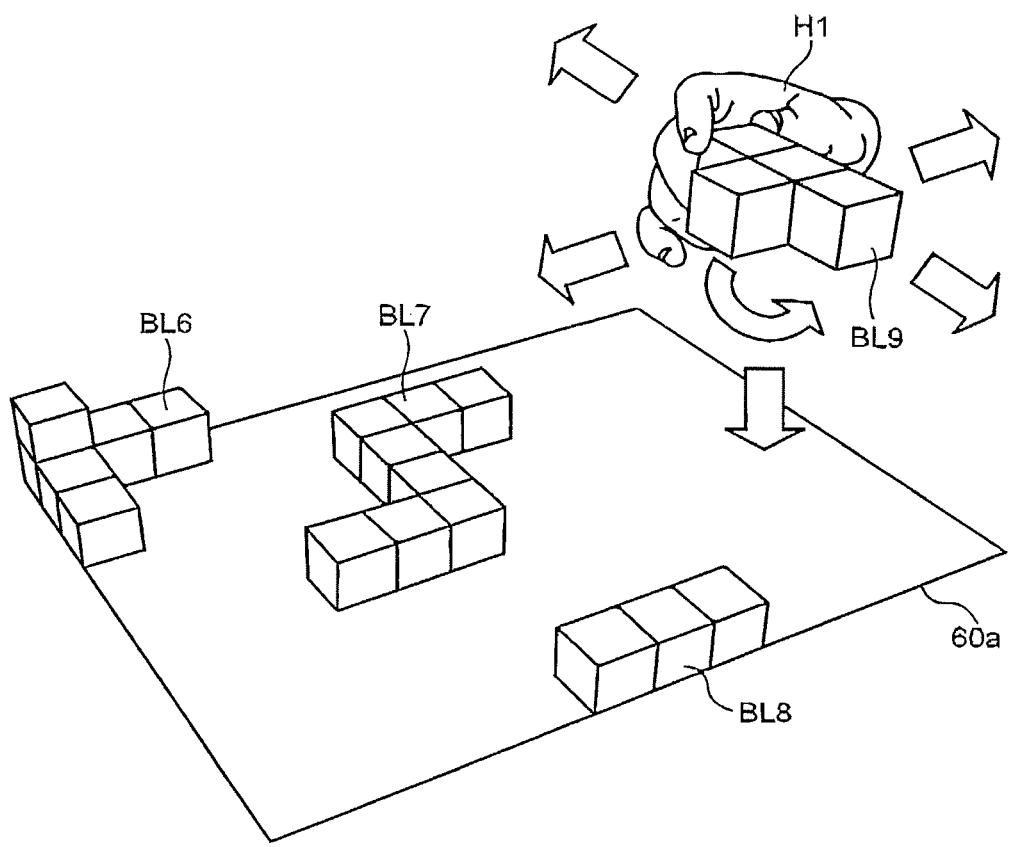
FIG. 6 is a diagram illustrating an example of operation performed with a three-dimensional object grasped.

FIG. 6 is a diagram illustrating an example of operation performed with the three-dimensional object grasped. In the example illustrated in FIG. 6, three-dimensional blocks BL6 to BL8 are in the stopped state and a three-dimensional block BL9 is in motion. In this scene, when the mobile phone 1 detects the operation of the user to grasp the three-dimensional block BL9 with a hand H1 and move the hand H1 in an optional direction, the mobile phone 1 moves the three-dimensional block BL9 in association with the movement of the hand H1. When the mobile phone 1 detects the operation of the user to grasp the three-dimensional block BL9 with the hand H1 and rotate the hand H1, the mobile phone 1 rotates the three-dimensional block BL9 in association with the rotation of the hand H1.

When the mobile phone 1 detects the operation of the user to release the hand from the three-dimensional block BL9, the mobile phone 1 starts moving the three-dimensional block BL9 again toward the bottom surface 60a. When the position or a direction of the three-dimensional block BL9 deviates from the section of the play space 60, the mobile phone 1 adjusts the position and the direction of the three-dimensional block BL9 to the section of the play space 60 by minimum correction. The mobile phone 1 limits the movement and the rotation of the three-dimensional block BL9 such that the three-dimensional block BL9 does not project from the play space 60 or that the three-dimensional block BL9 does not enter into another three-dimensional block. It is also possible to limit the movement of the three-dimensional block BL9 in an upper direction so as to inhibit a level of difficulty from lowering.

Figure 7:
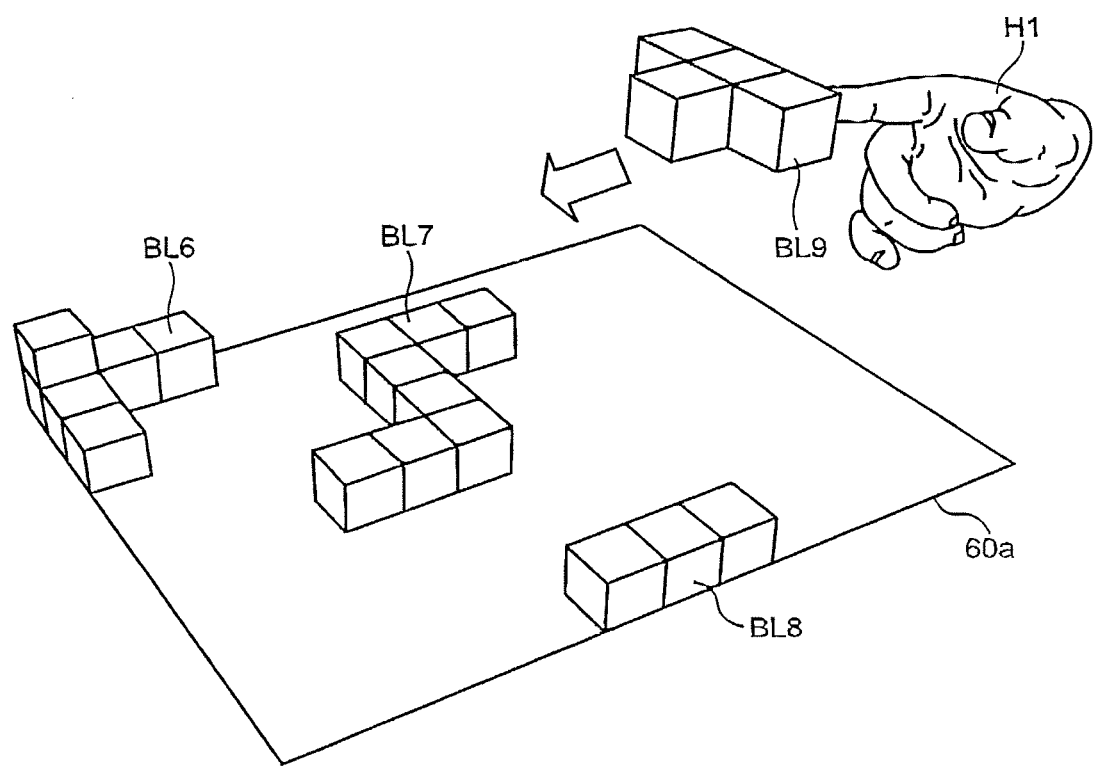
FIG. 7 is a diagram illustrating an example of operation of pushing a three-dimensional object.

FIG. 7 is a diagram illustrating an example of operation of pushing the three-dimensional object. In the example illustrated in FIG. 7, the three-dimensional blocks BL6 to BL8 are in the stopped state and the three-dimensional block BL9 is in motion. In this scene, when the mobile phone 1 detects the operation of the user to push the three-dimensional block BL9 with the hand H1, the mobile phone 1 moves the three-dimensional block BL9 in association with the movement of the hand H1.

When the mobile phone 1 detects the operation of the user to release the hand H1 from the three-dimensional block BL9, the mobile phone 1 starts moving the three-dimensional block BL9 again toward the bottom surface 60a. The mobile phone 1 may continuously move the three-dimensional block BL9 toward the bottom surface 60a while detecting the operation of the user to push. When the position of the three-dimensional block BL9 deviates from the section of the play space 60, the mobile phone 1 adjusts the position of the three-dimensional block BL9 to the section of the play space 60 by the minimum correction. The mobile phone 1 limits the movement of the three-dimensional block BL9 such that the three-dimensional block BL9 does not project from the play space 60 or that the three-dimensional block BL9 does not enter into another three-dimensional block.

In this manner, the user may score the points by strategically filling the layer of the play space 60 by changing the position and the direction of the three-dimensional block by the operation performed with the three-dimensional object grasped and the operation of pushing. The mobile phone 1 may change the position and the direction of the three-dimensional block according to the operation of the user within a predetermined time period (for example, within one second) even after any of the surfaces of the three-dimensional block opposed to the bottom surface 60a is brought into contact with the bottom surface 60a or another three-dimensional block in the stopped state. It is also possible that the mobile phone 1 is provided with a detecting unit, which measures acceleration or the movement applied thereto, (for example, an acceleration sensor) such that the mobile phone 1 may move the three-dimensional block in the stopped state when the detecting unit detects predetermined acceleration or movement. It is also possible that the mobile phone 1 moves the three-dimensional block in the stopped state according to the acceleration or the movement when the detecting unit detects the predetermined acceleration or movement.

Figure 8:
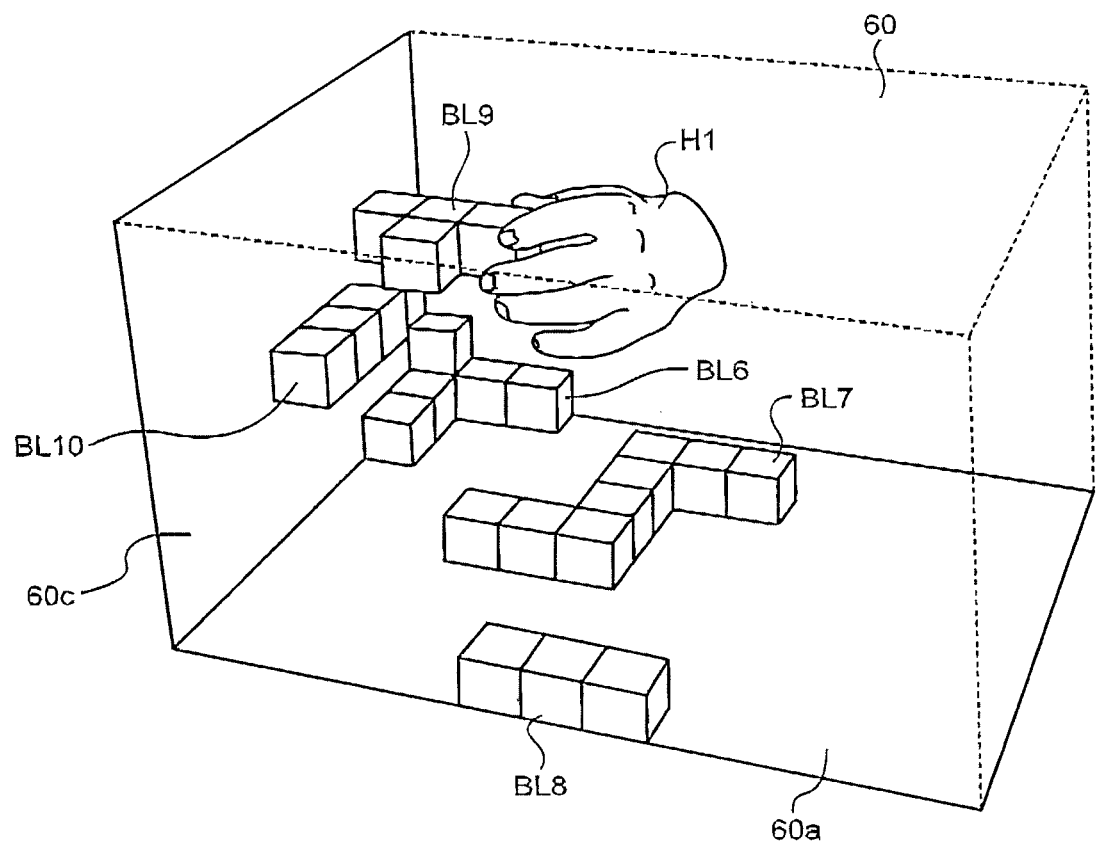
FIG. 8 is a diagram for explaining stop of movement at a side surface of a play space.

The mobile phone 1 stops the three-dimensional block not only when the three-dimensional block reaches the bottom surface 60a of the play space 60 but also when the three-dimensional block reaches a side surface by the operation of the user. FIG. 8 is a diagram for explaining stop of the movement at the side surface of the play space 60. In an example illustrated in FIG. 8, a three-dimensional block BL10 reaches a side surface 60c of the play space 60 by the operation of the user and is in the stopped state. The three-dimensional block BL9 is reaching the side surface 60c of the play space 60 by the operation of the user. Although the side surface 60c is visibly displayed in FIG. 8, the side surface 60c is not necessarily displayed.

When any of the surfaces of the three-dimensional block is brought into contact with the side surface of the play space 60 by the operation performed with the three-dimensional block grasped or the operation of pushing, the mobile phone 1 stops the three-dimensional block at that point of time. The mobile phone 1 may change the position and the direction of the three-dimensional block according to the operation of the user in place of setting the three-dimensional block to be in the stopped state within a predetermined time period (for example, within one second) even after the three-dimensional block reaches the side surface of the play space 60.

When a layer parallel to the side surface is filled with the elements of the three-dimensional block, which reaches the side surface of the play space 60, the mobile phone 1 deletes the layer. The mobile phone 1 moves a portion located on an inner side of the play space 60 than the filled layer of the remaining part of the three-dimensional block, which composes the filled layer, toward the bottom surface 60a until any of the surfaces opposed to the bottom surface 60a is brought into contact with the bottom surface 60a or another three-dimensional block in the stopped state.

The mobile phone 1 may also move the portion located on the inner side of the play space 60 than the filled layer toward the side surface, which the three-dimensional block reaches. The mobile phone 1 may also return the three-dimensional block to a movable state again when operation to pinch the three-dimensional block, which reaches the side surface of the play space 60, to move in a direction opposite to the side surface is detected. That is to say, the mobile phone 1 may allow the user to temporarily attach the three-dimensional block to the side surface and start moving the three-dimensional block again at optional timing.

The mobile phone 1 also accepts operation to handle the play space 60 as the three-dimensional object. FIG. 9 is a diagram illustrating an example of the operation to handle the play space 60 as the three-dimensional object. At Step SB1 illustrated in FIG. 9, the three-dimensional blocks BL6 to BL8 are in the stopped state and the three-dimensional block BLK9 is in motion. In this scene, when the mobile phone 1 detects the operation of the user to grasp the play space 60 with both hands at the side surfaces to rotate in a horizontal direction, the mobile phone 1 rotates the play space 60 in the horizontal direction in association with the movement of the both hands as illustrated at Step SB2.

At that time, the mobile phone 1 rotates the three-dimensional block in the stopped state together with the play space 60. In this manner, by rotating the three-dimensional block in the stopped state together with the play space 60, the user may see a stacked state of the three-dimensional blocks from a direction from which the state is easily seen. The mobile phone 1 may rotate the three-dimensional block in motion together with the play space 60 or not when the operation to rotate the play space 60 in the horizontal direction is detected. It is also possible that the three-dimensional block grasped by the user out of the three-dimensional blocks in motion is not rotated and other blocks are rotated together with the play space 60. The mobile phone 1 may correct a rotational amount such that the play space 60 is rotated in units of 90 degrees.

The user executes the operation to rotate the play space 60 in the horizontal direction as follows, for example. As illustrated at Steps SB1 and SB2, the user first arranges the hand H1 so as to abut a side surface 60d of the play space 60 and arranges a hand H2 so as to abut a side surface 60e opposed to the side surface 60d. Then, the user rotates the hands H1 and H2 as if there is a rotational axis on the center of the bottom surface 60a while maintaining an interval between the hands H1 and H2.

Figure 10:
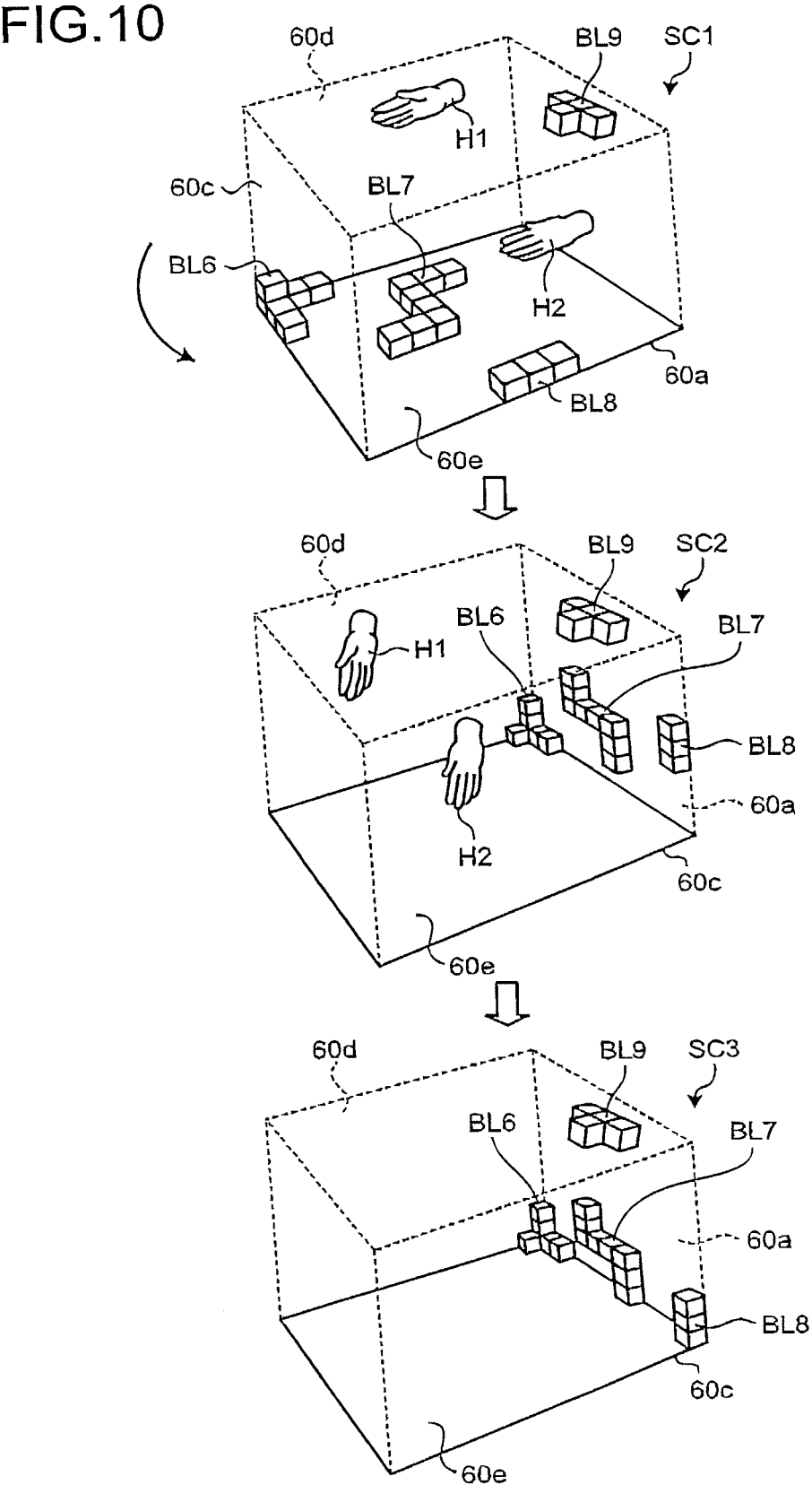
FIG. 10 is a diagram illustrating an example of another operation to handle the play space as a three-dimensional object.

FIG. 10 is a diagram illustrating an example of another operation to handle the play space 60 as the three-dimensional object. At Step SC1 illustrated in FIG. 10, the three-dimensional blocks BL6 to BL8 are in the stopped state and the three-dimensional block BL9 is in motion. In this scene, when the mobile phone 1 detects the operation of the user to grasp the play space 60 at the side surfaces with the both hands and rotate the play space 60 in a perpendicular direction, the mobile phone 1 rotates the play space 60 in the perpendicular direction in association with the movement of the both hands as illustrated at Step SC2.

At that time, the mobile phone 1 rotates the three-dimensional block in the stopped state together with the play space 60. When the mobile phone 1 detects that the both hands are released from the play space 60, the mobile phone 1 moves the three-dimensional block in the stopped state toward a new bottom surface (surface 60e in this example) as illustrated at Step SC3. When any of the surfaces in the moving direction of the three-dimensional block is brought into contact with the new bottom surface or another three-dimensional block in the stopped state, the mobile phone 1 sets the three-dimensional block to be in the stopped state. The control to move the three-dimensional block in the stopped state toward the new bottom surface may be executed each time the play space 60 is rotated by 90 degrees in the perpendicular direction.

In this manner, by changing arrangement of the three-dimensional block in the stopped state in association with the rotation of the play space 60 in the perpendicular direction, the user may drastically change the stacked state of the three-dimensional blocks. The mobile phone 1 may correct the rotational amount such that the play space 60 is rotated in units of 90 degrees when the play space 60 is rotated in the perpendicular direction. The mobile phone 1 may be configured such that the three-dimensional block in motion is not rotated together with the play space 60 when the play space 60 is rotated in the perpendicular direction.

The user executes the operation to rotate the play space 60 in the perpendicular direction as follows, for example. As illustrated at Steps SC1 and SC2, the user first arranges the hand H1 so as to abut the side surface 60d of the play space 60 and arranges the hand H2 so as to abut the side surface 60e opposed to the side surface 60d. Then, the user rotates the hands H1 and H2 in the same direction as if there is the rotational axis connecting the center of the side surface 60d and the center of the side surface 60e while maintaining the interval between the hands H1 and H2.

Although it is configured such that the mobile phone 1 moves the three-dimensional block in the stopped state toward the new bottom surface after the play space 60 is rotated in the perpendicular direction in the example illustrated in FIG. 10, it is also possible that the three-dimensional block in the stopped state is kept fixed to the side surface. The mobile phone 1 may also separate the three-dimensional block in the stopped state into the elements in section unit and move them toward the new bottom surface.

Figure 11:
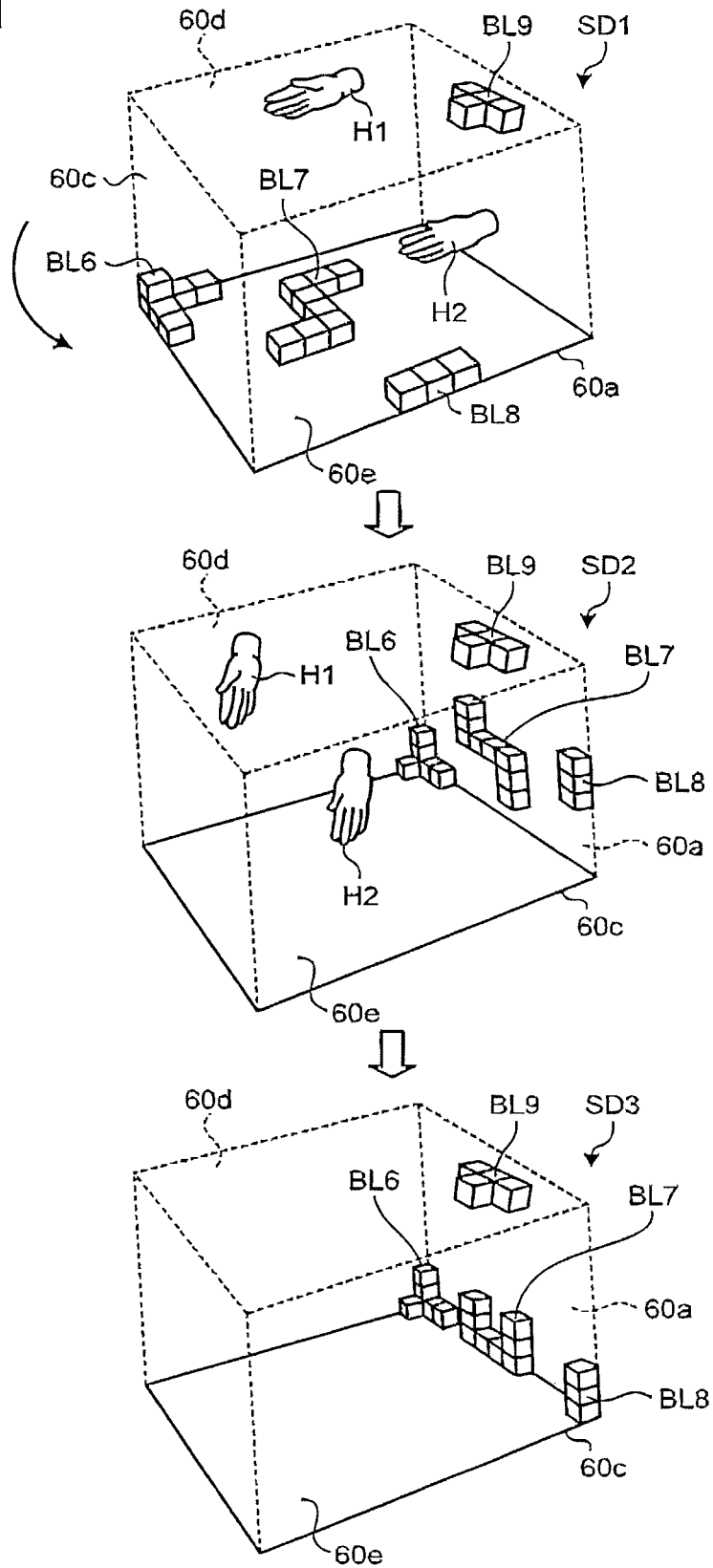
FIG. 11 is a diagram illustrating an example to separate a three-dimensional block in a stopped state into elements in section unit to move toward a bottom surface.

FIG. 11 is a diagram illustrating an example in which the three-dimensional block in the stopped state is separated into the elements in section unit to be moved toward the bottom surface. Steps SD1 and SD2 illustrated in FIG. 11 are the same as Steps SC1 and SC2 illustrated in FIG. 10. At Step SD3 illustrated in FIG. 11, the three-dimensional block in the stopped state is separated into the elements in section unit, so that a shape of the block BL7 is different from that at Step SC3 illustrated in FIG. 10. In this manner, by separating the three-dimensional block in the stopped state into the elements in section unit, the layer, which is in contact with the bottom surface, is filled with the elements, and as a result, the user may obtain the high score more easily.

The mobile phone 1 also accepts operation to handle the surface of the play space 60 as a thin three-dimensional object. FIG. 12 is a diagram illustrating an example of the operation to handle the surface of the play space 60 as the three-dimensional object. At Step SE1 illustrated in FIG. 12, the three-dimensional blocks BL6 to BL8 are in the stopped state and the three-dimensional block BL9 is in motion. In this scene, when the mobile phone 1 detects the operation of the user to grasp the bottom surface 60a of the play space 60 with the hand to rotate the play space 60 in the horizontal direction, the mobile phone 1 rotates the play space 60 in the horizontal direction in association with the movement of the hand as illustrated at Step SE2.

At that time, the mobile phone 1 rotates the three-dimensional block in the stopped state together with the play space 60. In this manner, by rotating the three-dimensional block in the stopped state together with the play space 60, the user may see the stacked state of the three-dimensional blocks from the direction from which the state is easily seen. The mobile phone 1 may rotate the three-dimensional block in motion together with the play space 60 or not when the operation to rotate the play space 60 in the horizontal direction is detected. It is also possible that the three-dimensional block grasped by the user out of the three-dimensional blocks in motion is not rotated and other blocks are rotated together with the play space 60. The mobile phone 1 may correct the rotational amount such that the play space 60 is rotated in units of 90 degrees.

The user executes the operation to rotate the play space 60 in the horizontal direction as follows, for example. As illustrated at Steps SE1 and SE2, the user first arranges the hand H1 so as to pinch the bottom surface 60a of the play space 60 with the fingers. Then, the user rotates the hand H1 as if there is the rotational axis on the center of the bottom surface 60a.

The mobile phone 1 also accepts operation of disassembling the three-dimensional block and operation of combining the three-dimensional blocks. FIG. 13 is a diagram illustrating an example of the operation of disassembling the three-dimensional block. At Step SF1 illustrated in FIG. 13, the user grasps a part of the three-dimensional block BL9 in motion with the hand H1 and grasps another part with the hand H2. In this scene, when the mobile phone 1 detects the operation of the user to disassemble the three-dimensional block BL9, the mobile phone 1 disassembles the three-dimensional block BL9 into three-dimensional blocks BL9a and BL9b according to the detected operation as illustrated at Step SF2. When the mobile phone 1 detects that the hands of the user are released from the three-dimensional blocks BL9a and BL9b, the mobile phone 1 moves the three-dimensional blocks BL9a and BL9b toward the bottom surface.

In this manner, it becomes easy for the user to fill the layer of the play space 60 by disassembling the three-dimensional block. The level of difficulty of the game lowers if the three-dimensional block may be disassembled without limit, so that the mobile phone 1 may limit the number of times or frequency of disassembly of the three-dimensional block. The mobile phone 1 may also deform the three-dimensional block in place of disassembling the three-dimensional block when the similar operation is detected.

The user executes the operation of disassembling the three-dimensional block BL9 as follows, for example. As illustrated at Step SF1, the user first arranges the hand H1 so as to pinch a part of the three-dimensional block BL9 with the fingers and arranges the hand H2 so as to pinch another part of the three-dimensional block BL9 with the fingers. Then, the user changes angles of the hands H1 and H2 so as to bend the three-dimensional block BL9 as illustrated at Step SF2. The user may also move the hands H1 and H2 in opposite directions so as to pull the three-dimensional block BL9 while maintaining a shape of the finger to grasp the three-dimensional block BL9 in order to disassemble the three-dimensional block BL9.

FIG. 14 is a diagram illustrating an example of the operation of combining the three-dimensional blocks. At Step SG1 illustrated in FIG. 14, the user grasps the three-dimensional block BL9 in motion with the hand H1 and grasps the three-dimensional block BL11 in motion with the hand H2. In this scene, when the mobile phone 1 detects the operation of the user to bring the three-dimensional block BL9 into contact with the three-dimensional block BL11, the mobile phone 1 combines the three-dimensional blocks BL9 and BL11 into a three-dimensional block BL12 as illustrated at Step SG2. When the mobile phone 1 detects that the hands of the user are released from the three-dimensional block BL12, the mobile phone 1 moves the three-dimensional block BL12 toward the bottom surface.

The user executes the operation of combining the three-dimensional block BL9 as follows, for example. As illustrated at Step SG1, the user first arranges the hand H1 so as to pinch the three-dimensional block BL9 with the fingers and arranges the hand H2 so as to pinch the three-dimensional block BL11 with the fingers. Then, the user moves the hands H1 and H2 such that the surface of the three-dimensional block BL9 and that of the three-dimensional block BL11 are overlapped with each other as illustrated at Step SG2. As a result, the three-dimensional blocks BL9 and BL11 are combined with each other as if the overlapped surfaces are bonded to each other.

Figure 15:
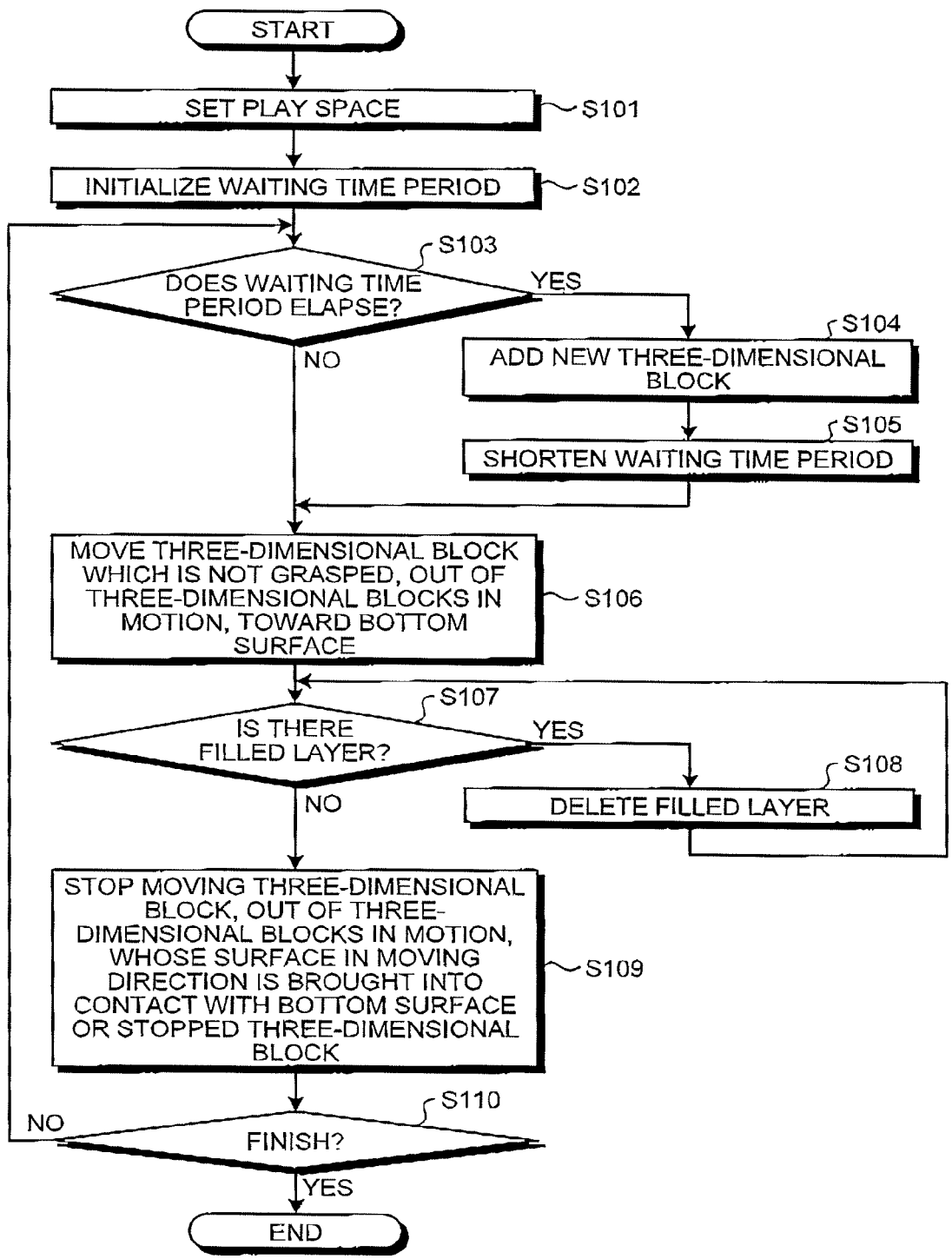
FIG. 15 is a flowchart illustrating a procedure of a basic process executed by the mobile phone about control of a three-dimensional block.

Then, a procedure of a basic process executed by the mobile phone 1 about the control of the three-dimensional block is described with reference to FIG. 15. FIG. 15 is a flowchart illustrating the procedure of the basic process executed by the mobile phone 1 about the control of the three-dimensional block. The procedure illustrated in FIG. 15 is realized by execution of the control program 24a by the control unit 22.

As illustrated in FIG. 15, the control unit 22 first sets the play space 60 at Step S101. Specifically, the control unit 22 sets a size and the number of the sections, which compose the play space 60, based on setting data and the like stored in the storage unit 24. The control unit 22 initializes a waiting time period at Step S102.

Subsequently, the control unit 22 judges whether the waiting time period elapses at Step S103. When the waiting time period never elapses, a criterion time point from which it is judged whether the waiting time period elapses is an initial time point of the procedure illustrated in FIG. 15, for example. When the waiting time period already elapses one or more times, the criterion time point from which it is judged whether the waiting time period elapses is a time point at which a previous waiting time period elapses.

When the waiting time period elapses (Step S103, Yes), the control unit 22 allows the new three-dimensional block to appear in the vicinity of the top surface of the play space 60 at Step S104 and starts moving the three-dimensional block toward the bottom surface. Then, the control unit 22 shortens the waiting time period at Step S105. By shortening the waiting time period, the interval between each appearance of the new three-dimensional block is gradually shortened. When the waiting time period does not elapse (Step S103, No), Steps S104 and S105 are not executed.

Subsequently, the control unit 22 moves the three-dimensional block, which is not grasped, out of the three-dimensional blocks in motion toward the play space 60 at Step S106. The control unit 22 judges whether there is the layer filled with the elements of the three-dimensional block in the play space 60 at Step S107. When there is the filled layer (Step S107, Yes), the control unit 22 deletes the filled layer and moves the remaining part of the three-dimensional block separated by the deletion of the layer toward the bottom surface at Step S108. Then, the control unit 22 executes the judgment at Step S107 again.

When there is no filled layer (Step S107, No), the control unit 22 stops moving the three-dimensional block, any of the surfaces in the moving direction of which is brought into contact with the bottom surface or another stopped three-dimensional block, out of the three-dimensional blocks in motion at Step S109. Then, the control unit 22 judges whether to finish the process at Step S110. When the user performs predetermined operation to indicate to finish the process or when the three-dimensional blocks are stacked such that it is not possible to allow the new three-dimensional block to appear, the control unit 22 judges to finish the process. When the process is finished (Step S110, Yes), the control unit 22 completes the procedure. When the process is not finished (Step S110, No), the control unit 22 executes Step S103 and subsequent Steps again.

The mobile phone 1 executes the control about the operation with the three-dimensional object grasped and the control about the operation of pushing in parallel with the procedure illustrated in FIG. 15. The control about the operation with the three-dimensional object grasped is hereinafter described with reference to FIGS. 16 to 21. The control about the operation of pushing is described with reference to FIGS. 22 to 26.

Figure 16:
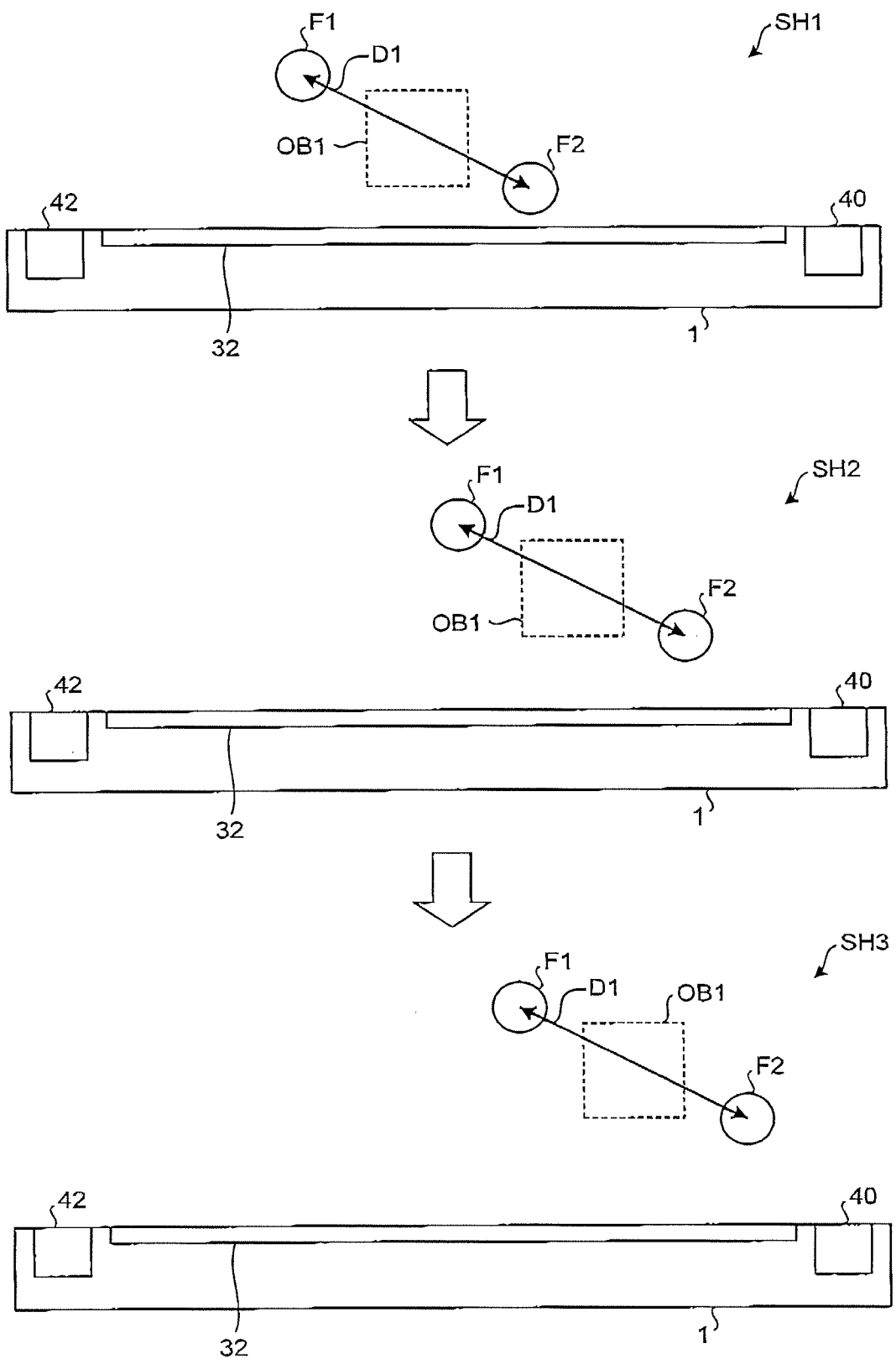
FIG. 16 is a diagram for explaining detection of an operation performed with a three-dimensional object grasped.
Figure 17:
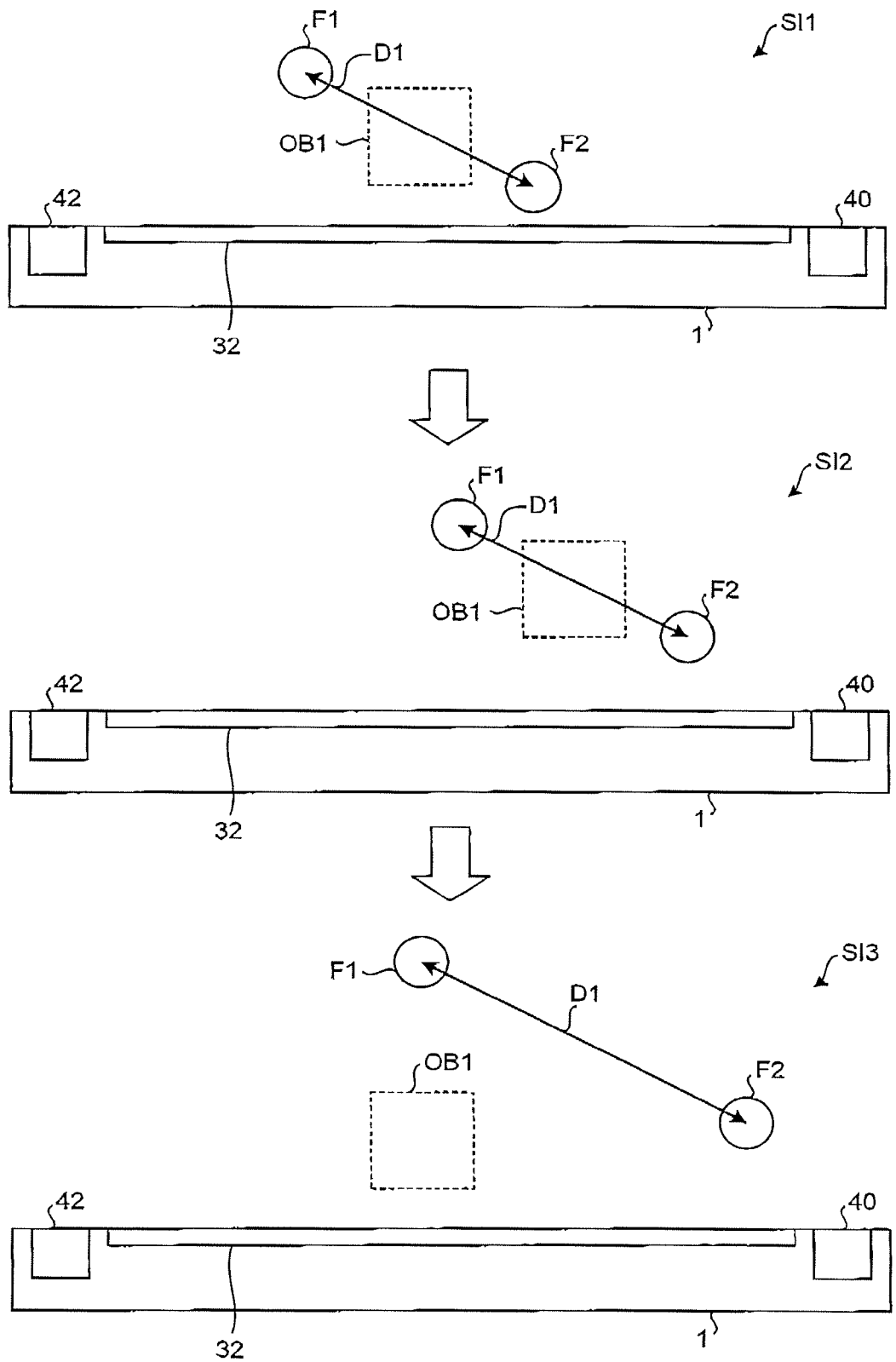
FIG. 17 is a diagram for explaining a detection of an operation performed with a three-dimensional object grasped.

FIGS. 16 and 17 are views illustrating the detection of the operation performed with the three-dimensional object grasped. At Step SH1 illustrated in FIG. 16, a three-dimensional object OB1 is stereoscopically displayed in the three-dimensional space by the touch panel 32. The user moves fingers F1 and F2 such that the three-dimensional object OB1 is located between the fingers F1 and F2 in order to select the three-dimensional object OB1.

When two objects are detected in the three-dimensional space and the three-dimensional object OB1 is located between the two objects, the mobile phone 1 monitors change in distance between the two objects. When the distance is substantially constant for a longer period of time than a predetermined time, the mobile phone 1 judges that the three-dimensional object OB1 is selected and sets the three-dimensional object OB1 to be in a selected state. The mobile phone 1 notifies the user of the selected state of the three-dimensional object OB1 by changing a display mode of the three-dimensional object OB1 and the like.

While the mobile phone 1 monitors the change in distance between the two objects, it is not required that the two objects remain at the positions to interpose the three-dimensional object OB1 therebetween. That is to say, after the user moves the fingers F1 and F2 such that the three-dimensional object OB1 is located between the fingers F1 and F2 as illustrated at Step SH1, the user may move the fingers F1 and F2 to other positions without maintaining this state.

It is supposed that the user moves the fingers F1 and F2 while maintaining a distance D1 therebetween substantially constant as illustrated at Step SH2 from the state at Step SH1. In this case, the mobile phone 1 changes the three-dimensional object OB1 so as to move and rotate the three-dimensional object OB1 according to the movements of the fingers F1 and F2 from a stage at which it is detected that the three-dimensional object OB1 is displayed between the fingers F1 and F2, that is to say, at the stage at Step SH1. The mobile phone 1 sets the three-dimensional object OB1 to be in the selected state at a stage at which the state in which the distance D1 between the fingers F1 and F2 is maintained substantially constant continues for the longer period of time than the predetermined time as illustrated at Step SH3.

When the distance D1 between the fingers F1 and F2 increases before the predetermined time period elapses as illustrated at Steps SI1 to SI3 in FIG. 17, that is to say, when the selection is not made, the mobile phone 1 makes a reverse change to the change made by then to the three-dimensional object OB1. As a result, the three-dimensional object OB1 is displayed at the same position and in the same state as those at the stage at Step SI1. A speed at which the reverse change is made to the three-dimensional object OB1 may be higher than the speed at which the change is made to the three-dimensional object OB1 by then. That is to say, it is possible to make the reverse change to the three-dimensional object OB1 as if it is reversely reproduced at a high speed.

In this manner, the user may recognize that the three-dimensional object is being selected before the selection is determined by starting making the change to the three-dimensional object at the stage at which it is detected that the three-dimensional object is displayed between the two objects. As a result, the user may know whether an intended three-dimensional object is selected at an early stage. It is possible to display the three-dimensional object to which the change is made in a mode different from that of normal time or the selected state (for example, translucent) until the state in which the distance between the two objects is maintained substantially constant continues for the longer period of time than the predetermined time, thereby allowing the user to easily distinguish the state of the three-dimensional object.

It is also possible to start changing the three-dimensional object OB1 after the three-dimensional object OB1 is set to be in the selected state in place of changing the three-dimensional object OB1 according to the movements of the fingers F1 and F2 from the stage at Step SH1. It is also possible to set the three-dimensional object OB1 to be in the selected state only when the state in which the three-dimensional object OB1 is located between the fingers F1 and F2 as at Step SH1 continues for the longer period of time than the predetermined time.

Figure 18:
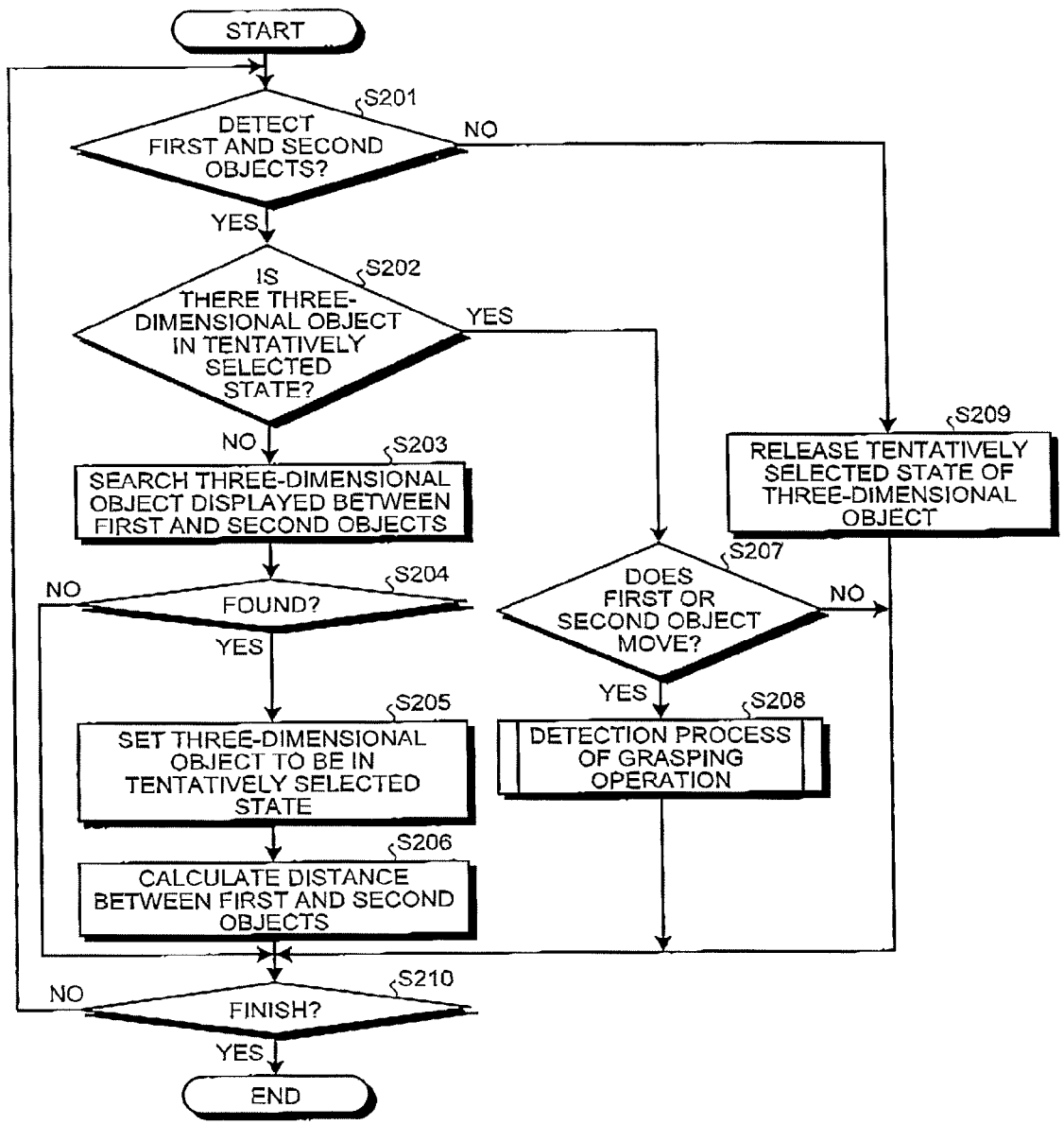
FIG. 18 is a flowchart illustrating a procedure of a detection process of selection of a three-dimensional object.

FIG. 18 is a flowchart illustrating a procedure of a detecting process of the selection of the three-dimensional object. The procedure illustrated in FIG. 18 is realized by the execution of the control program 24a by the control unit 22. As illustrated in FIG. 18, the control unit 22 judges whether first and second objects are detected by the detecting unit, that is to say, by the imaging units 40 and 42, at Step S201. When the first and second objects are not detected (Step S201, No), the control unit 22 releases a tentatively selected state of the three-dimensional object at Step S209 if there is the three-dimensional object in the tentatively selected state.

The control unit 22 judges whether to finish the process at Step S210. When the process is finished (Step S210, Yes), the control unit 22 completes the procedure. When the process is not finished (Step S210, No), the control unit 22 executes Step S201 and subsequent Steps again.

When the first and second objects are detected (Step S201, Yes), the control unit 22 judges whether there is the three-dimensional object in the tentatively selected state at Step S202. When there is no three-dimensional object in the tentatively selected state (Step S202, No), the control unit 22 searches the three-dimensional object displayed between the first and second objects out of the displayed three-dimensional objects at Step S203. When the three-dimensional object is not found (Step S204, No), the control unit 22 executes Step S210.

When the three-dimensional object displayed between the first and second objects is found (Step S204, Yes), the control unit 22 sets the three-dimensional object displayed between the first and second objects to be in the tentatively selected state at Step S205. The control unit 22 calculates a distance between the first and second objects at Step S206. Then, the control unit 22 executes Step S210.

When the first and second objects are detected and there is the three-dimensional object in the tentatively selected state (Step S202, Yes), the control unit 22 judges whether at least one of the first and second objects moves at Step S207. When any of the first and second objects does not move (Step S207, No), the control unit 22 executes Step S210.

Figure 19:
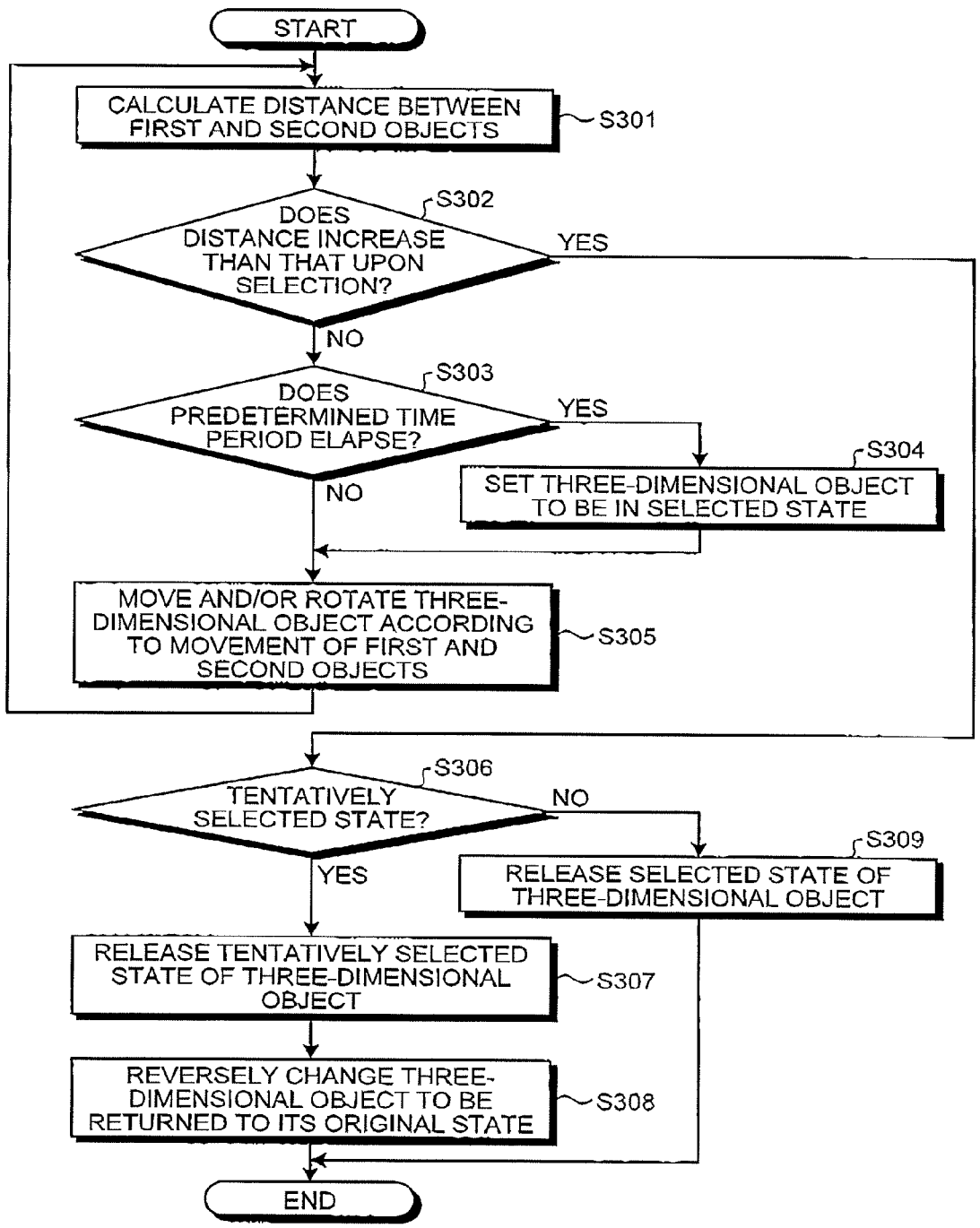
FIG. 19 is a flowchart illustrating a procedure of a detection process of grasping operation.

When at least one of the first and second objects moves (Step S207, Yes), the control unit 22 executes a detection process of grasping operation illustrated in FIG. 19 at Step S208 and changes the three-dimensional object in the selected state according to the detected operation during the detection process of grasping operation. After the detection process of the grasping operation is finished, the control unit 22 executes Step S210.

FIG. 19 is a flowchart illustrating a procedure of the detection process of the grasping operation. The procedure illustrated in FIG. 19 is realized by the execution of the control program 24a by the control unit 22. As illustrated in FIG. 19, the control unit 22 first calculates the distance between the first and second objects at Step S301. Then, the control unit 22 judges whether the distance between the first and second objects increases after the detection process of the grasping operation is started, at Step S302.

When the distance between the first and second objects is substantially constant (Step S302, No), the control unit 22 judges whether a predetermined time period elapses from the start of the detection process of the grasping operation at Step S303. when the predetermined time period elapses (Step S303, Yes), the control unit 22 sets the three-dimensional object to be in the selected state at Step S304 if there is the three-dimensional object in the tentatively selected state. When the predetermined time period does not elapse (Step S303, No), Step S304 is not executed.

Subsequently, the control unit 22 moves or rotates the three-dimensional object according to the detected movements of the first and second objects at Step S305. For example, when the first and second objects are the hands and when the grasped three-dimensional object is the play space 60, the control unit 22 makes the change illustrated in FIGS. 9 to 11 to the play space 60 according to the movements of the first and second objects. When the first and second objects are the fingers and the grasped three-dimensional object is the three-dimensional block, the control unit 22 makes the change illustrated in FIGS. 6, 8, 13, and 14 to the three-dimensional block. The control unit 22 executes Step S301 and subsequent Steps again.

When the distance between the first and second objects increases (Step S302, Yes), the control unit 22 judges whether the three-dimensional object displayed between the first and second objects is in the tentatively selected state at Step S306.

When the three-dimensional object is in the tentatively selected state (Step S306, Yes), the control unit 22 releases the tentatively selected state of the three-dimensional object at Step S307. The control unit 22 makes the reverse change to the three-dimensional object to return the three-dimensional object to its original state at Step S308. Then, the control unit 22 finishes the detection process of the grasping operation.

When the three-dimensional object is not in the tentatively selected state, that is to say, when the three-dimensional object is in the selected state (Step S306, No), the control unit 22 releases the selected state of the three-dimensional object at Step S309. Then, the control unit 22 finishes the detection process of the grasping operation.

Figure 20:
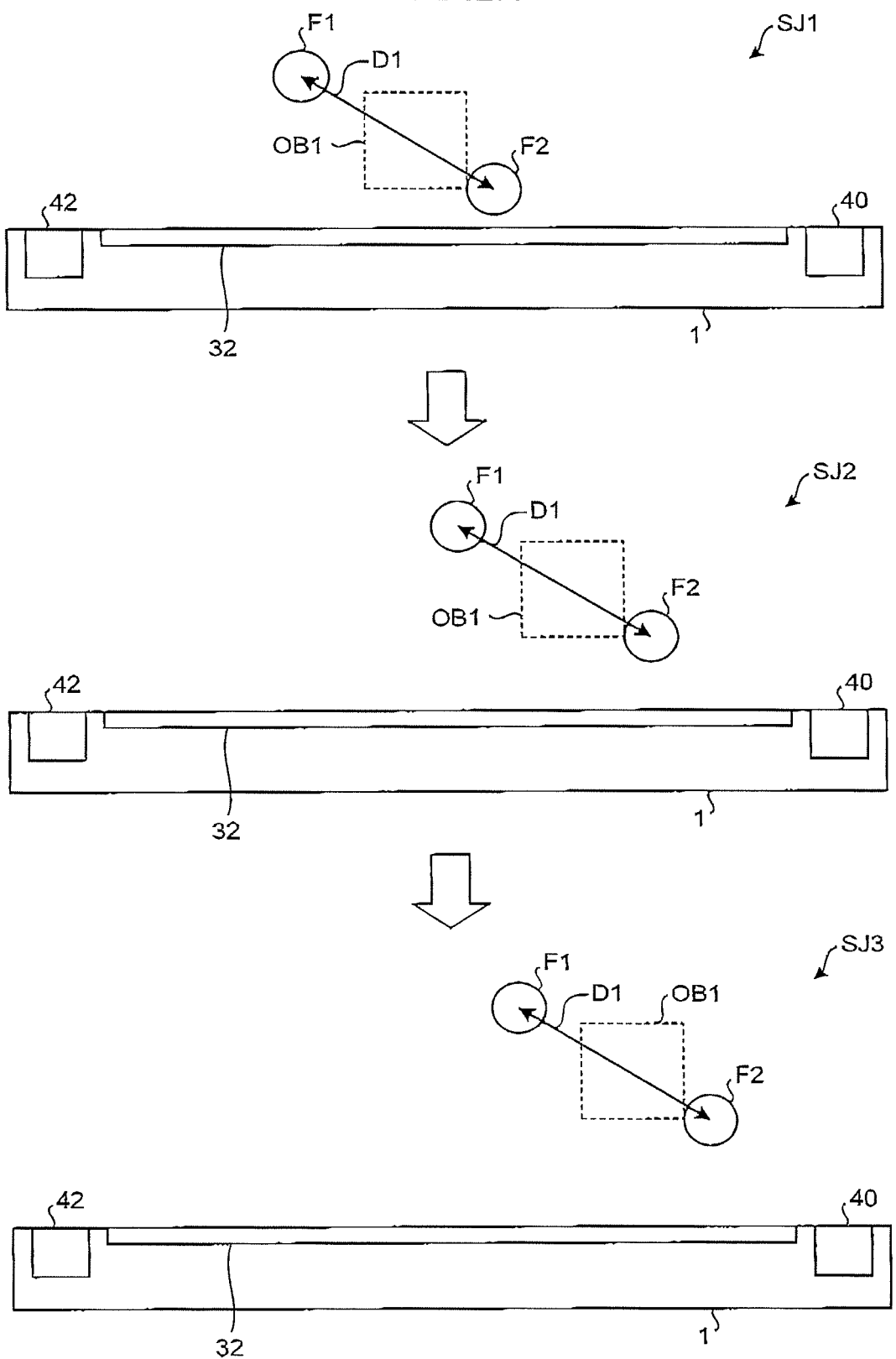
FIG. 20 is a diagram for explaining detection of another operation performed with a three-dimensional object grasped.

It is also possible to add a fact that the distance between the first and second objects is maintained substantially constant for a longer period of time than a predetermined time after at least one of the first and second objects is brought into contact with the three-dimensional object as at Steps SJ1 to SJ3 illustrated in FIG. 20 to conditions to select the three-dimensional object. By adding the contact with the three-dimensional object to the conditions of the selection, the user may easily select a desired three-dimensional object when a plurality of three-dimensional objects are displayed so as to be adjacent to each other.

FIG. 21 is a flowchart illustrating the procedure of the detecting process of the selection when the contact with the three-dimensional object is added to the conditions of the selection. As illustrated in FIG. 21, the control unit 22 judges whether the first and second objects are detected by the detecting unit, that is to say, the imaging units 40 and 42 at Step S401. When the first and second objects are not detected (Step S401, No), the control unit 22 releases the tentatively selected state of the three-dimensional object if there is the three-dimensional object in the tentatively selected state at Step S409.

Subsequently, the control unit 22 judges whether to finish the process at Step S410. When the process is finished (Step S410, Yes), the control unit 22 completes the procedure. When the process is not finished (Step S410, No), the control unit 22 executes Step S401 and subsequent Steps again.

When the first and second objects are detected (Step S401, Yes), the control unit 22 judges whether there is the three-dimensional object in the tentatively selected state at Step S402. When there is no three-dimensional object in the tentatively selected state (Step S402, No), the control unit 22 searches the three-dimensional object, which is in contact with at least one of the first and second objects, from the displayed three-dimensional objects at Step S403. When the three-dimensional object is not found (Step S404, No), the control unit 22 executes Step S410.

When the three-dimensional object, which is in contact with at least one of the first and second objects, is found (Step S404, Yes), the control unit 22 sets the three-dimensional object displayed between the first and second objects to be in the tentatively selected state at Step S405. The control unit 22 calculates the distance between the first and second objects at Step S406. Then, the control unit 22 executes Step S410.

When the first and second objects are detected and there is the three-dimensional object in the tentatively selected state (Step S402, Yes), the control unit 22 judges whether at least one of the first and second objects moves at Step S407. When any of the first and second objects does not move (Step S407, No), the control unit 22 executes Step S410.

When at least one of the first and second objects moves (Step S407, Yes), the control unit 22 executes the detection process of the grasping operation illustrated in FIG. 19 at Step S408 and changes the three-dimensional object in the selected state according to the detected operation during the detection process of the grasping operation. After the detection process of the grasping operation is finished, the control unit 22 executes Step S410.

FIG. 22 is a diagram illustrating an example of the information stored in the action data 24c. As illustrated in FIG. 22, the change in the three-dimensional object when the operation of pushing is detected differs according to presence of a fulcrum, presence of an obstacle in a pushed direction, and a pushed speed. The term "obstacle" is herein intended to mean the surface of the play space 60 and another three-dimensional object. It is judged whether the pushed speed is high or low based on a threshold.

When the three-dimensional object does not have the fulcrum and when there is no obstacle in the pushed direction, the three-dimensional object is displayed so as to move in the pushed direction according to a pushed amount. It may be determined whether the three-dimensional object moves together with the object, which pushes, or moves away from the object so as to be flipped by the object, which pushes, based on the pushed speed, for example.

When the three-dimensional object does not have the fulcrum and when there is a fixed obstacle, which is the stopped three-dimensional object or the surface of the play space 60, in the pushed direction, the three-dimensional object is displayed so as to move in the pushed direction according to the pushed amount and stop at a time point at which the three-dimensional object is brought into contact with the obstacle. When the pushed speed is high, it is possible that the three-dimensional object breaks the obstacle to continuously move. When the three-dimensional object is brought into contact with the obstacle while the three-dimensional object moves away from the object so as to be flipped by the object, which pushes, the three-dimensional object may be moved in an opposite direction such that the three-dimensional object bounces back therefrom.

When the three-dimensional object does not have the fulcrum, when there is an unfixed obstacle, which is the three-dimensional block in motion, in the pushed direction, and when the pushed speed is low, the three-dimensional object is displayed so as to move in the pushed direction according to the pushed amount and move together with the obstacle after the three-dimensional object is brought into contact with the obstacle. When the three-dimensional block does not have the fulcrum, when there is the unfixed obstacle, which is the three-dimensional object in motion, in the pushed direction, and when the pushed speed is high, the three-dimensional object is displayed so as to move in the pushed direction according to the pushed amount. After the three-dimensional object is brought into contact with the obstacle, the obstacle is displayed so as to be flipped to move. After the three-dimensional object is brought into contact with the obstacle, the three-dimensional object may stop at that position or continuously move at a lower speed.

When the three-dimensional object has the fulcrum, the three-dimensional object is displayed so as to rotate around the fulcrum according to the pushed direction and the pushed amount. Herein, the term "rotation" is intended to mean 360-degree rotation or the rotation to reciprocate within a predetermined rotational region.

Figure 23:
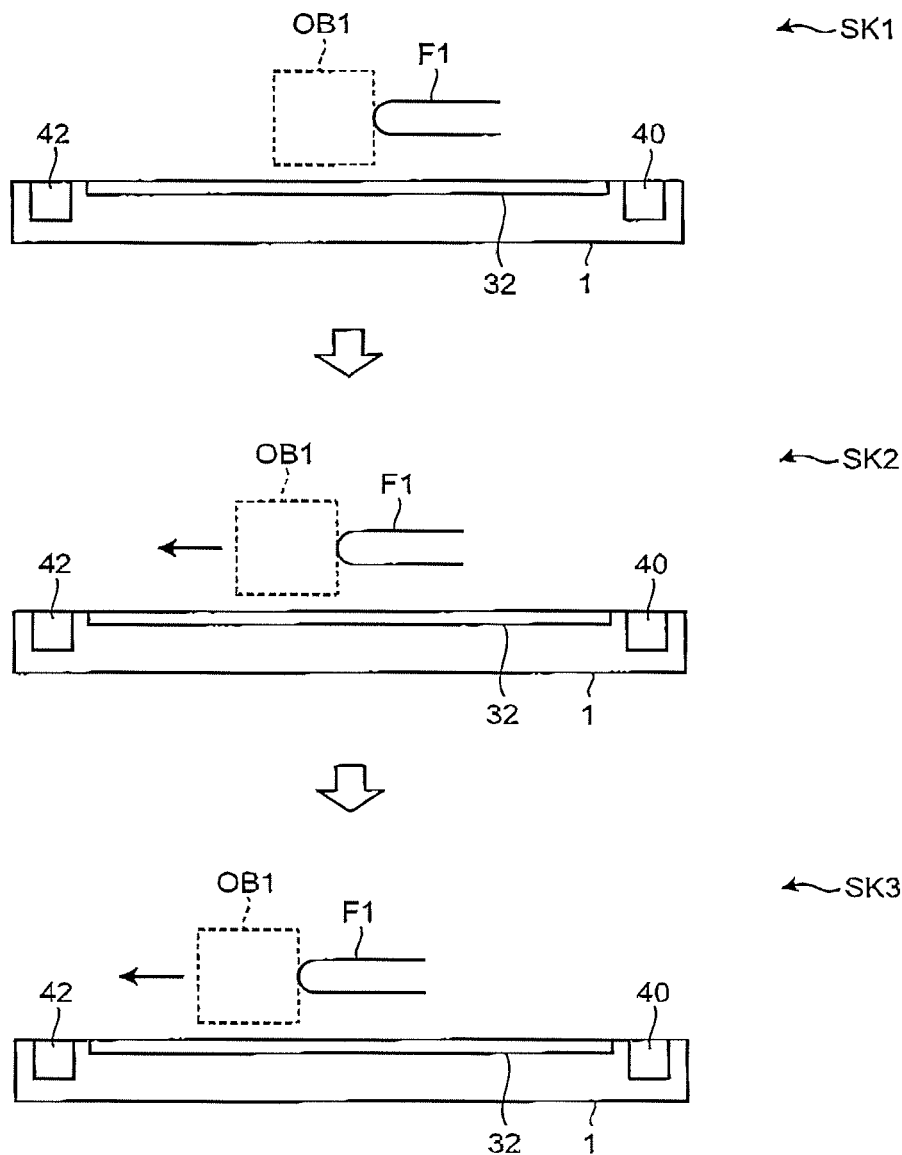
FIG. 23 is a diagram for explaining detection of operation of pushing a three-dimensional object.
Figure 24:
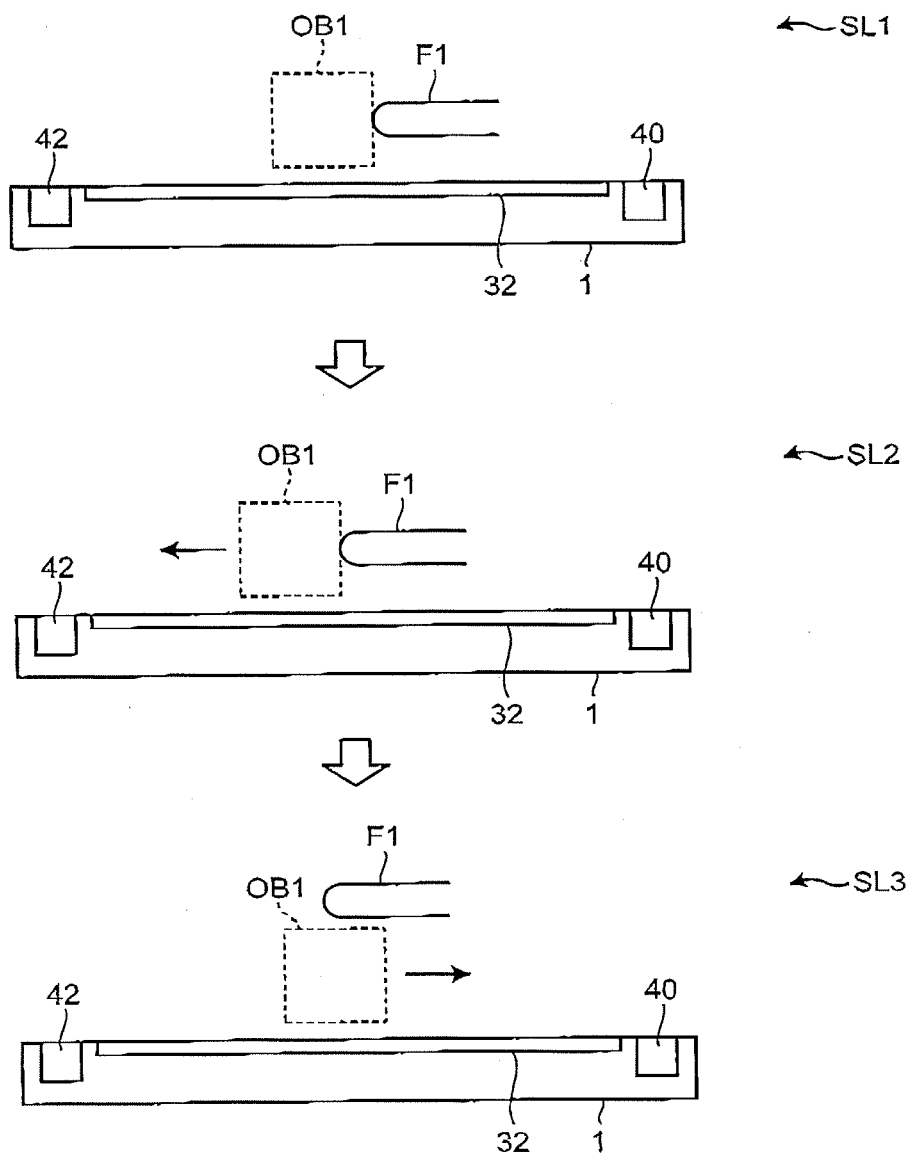
FIG. 24 is a diagram for explaining detection of operation of pushing a three-dimensional object.

FIGS. 23 and 24 are views illustrating the detection of the operation of pushing the three-dimensional object. At Step SK1 illustrated in FIG. 23, the three-dimensional object OB1 is stereoscopically displayed in the three-dimensional space by the touch panel 32. The user brings the finger F1 into contact with the three-dimensional object OB1.

Herein, it is supposed that the user allow the finger F1 to enter into the three-dimensional object OB1. When the mobile phone 1 detects that the object, which is brought into contact with the three-dimensional object OB1, moves into the three-dimensional object OB1, the mobile phone 1 changes the three-dimensional object OB1 according to the operation by the finger F1 from that time point as illustrated at Step SK2. In an example illustrated in FIG. 23, the three-dimensional object OB1 starts moving in association with the movement of the finger F1 at Step SK2.

At a stage at which the movement of the finger F1 into the three-dimensional object OB1 continues for a longer period of time than a predetermined time as illustrated at Step SK3, the mobile phone 1 determines the three-dimensional object OBI as an operational target. The mobile phone 1 notifies the user that the three-dimensional object OB1 is determined to be the operational target by changing the display mode of the three-dimensional object OB1 and the like. Thereafter, the mobile phone 1 continuously changes the three-dimensional object OB1 while the movement of the finger F1 into the three-dimensional object OB1 is detected.

When the movement of the finger F1 into the three-dimensional object OB1 is no longer detected before the predetermined time period elapses as illustrated at Step SL3 in FIG. 24, the mobile phone 1 makes the reverse change to the change made by then to the three-dimensional object OB1. As a result, the three-dimensional object OB1 is displayed at the same position in the same state as those at the stage at Step SK1 (Step SL1). A speed at which the reverse change is made to the three-dimensional object OB1 may be higher than the speed at which the change is made to the three-dimensional object OB1 by then. That is to say, it is possible to make the reverse change to the three-dimensional object OB1 as if it is reversely reproduced at a high speed.

In this manner, by starting changing the three-dimensional object from the stage at which the entry of the object into the three-dimensional object is detected, the user may recognize that the three-dimensional object is being selected before the selection is determined. As a result, the user may know whether the intended three-dimensional object is selected at the early stage. When the three-dimensional object, which is not intended, is selected, the user may return the three-dimensional object, which is unintentionally selected, to its original state by stopping the operation before the predetermined time period elapses.

It is also possible to display the three-dimensional object to which the change is made in the mode different from that of the normal time or the state in which the selection as the operational target is determined (for example, translucent) until the movement of the finger F1 into the three-dimensional object OB1 continues for the longer period of time than the predetermined time. By changing the display mode in this manner, the user may easily distinguish the state of the three-dimensional object.

It is also possible to start changing the three-dimensional object OB1 after the three-dimensional object OB1 is set to be in the selected state instead of changing the three-dimensional object OB1 according to the movement of the finger F1 from the stage at Step SK1. It is also possible to determine the three-dimensional object OB1 as the operational target only when the state in which the finger F1 is brought into contact with the three-dimensional object OB1 as at Step SK1 continues for the longer period of time than the predetermined time.

Figure 25:
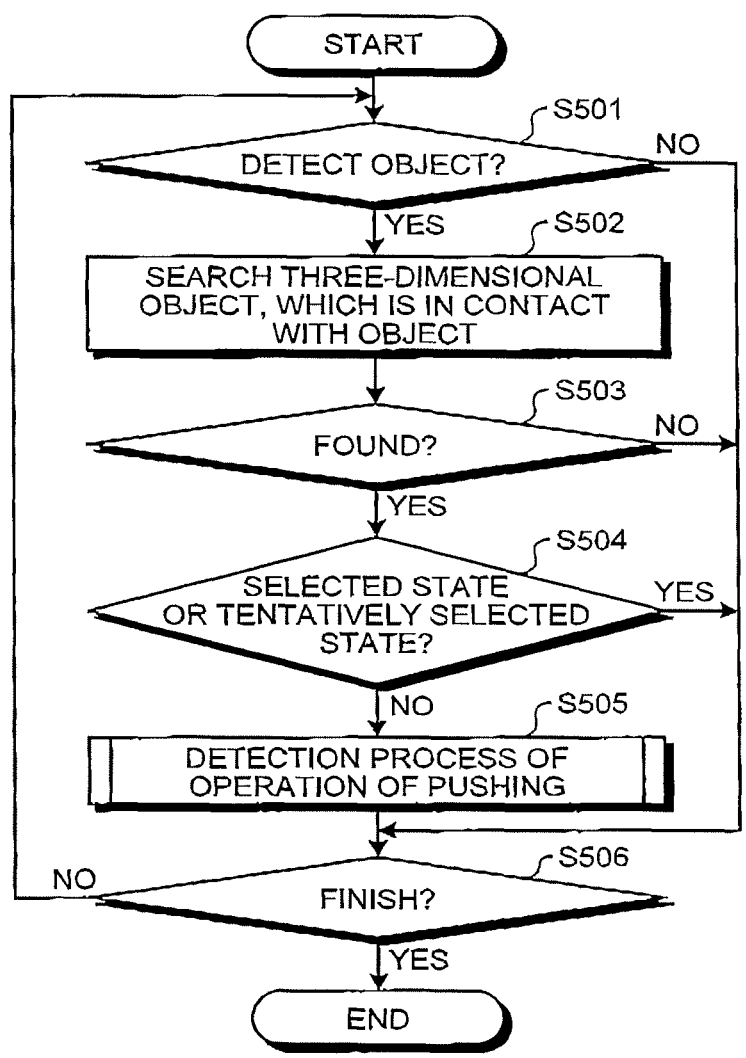
FIG. 25 is a flowchart illustrating a procedure of a detection process of contact with a three-dimensional object.

FIG. 25 is a flowchart illustrating a procedure of a detection process of contact with the three-dimensional object. The procedure illustrated in FIG. 25 is realized by the execution of the control program 24a by the control unit 22.

As illustrated in FIG. 25, the control unit 22 first judges whether a predetermined object is detected by the detecting unit, that is to say, the imaging units 40 and 42 at Step S501. The predetermined object is the finger of the user, for example. When the predetermined object is not detected (Step S501, No), the control unit 22 judges whether to finish the process at Step S506. When the process is finished (Step S506, Yes), the control unit 22 completes the procedure. When the process is not finished (Step S506, No), the control unit 22 executes Step S501 and subsequent Steps again.

When the predetermined object is detected (Step S501, Yes), the control unit 22 searches the three-dimensional object, which is in contact with the predetermined object, at Step S502. When there is no three-dimensional object, which is in contact with the predetermined object (Step S503, No), the control unit 22 executes Step S506.

When the three-dimensional object, which is in contact with the predetermined object, is found (Step S503, Yes), the control unit 22 judges whether the three-dimensional object is in the selected state or the tentatively selected state at Step S504. When the three-dimensional object is in the selected state or the tentatively selected state, that is to say, when the three-dimensional object is a target of the operation of pushing (Step S504, Yes), the control unit 22 executes Step S506.

Figure 26:
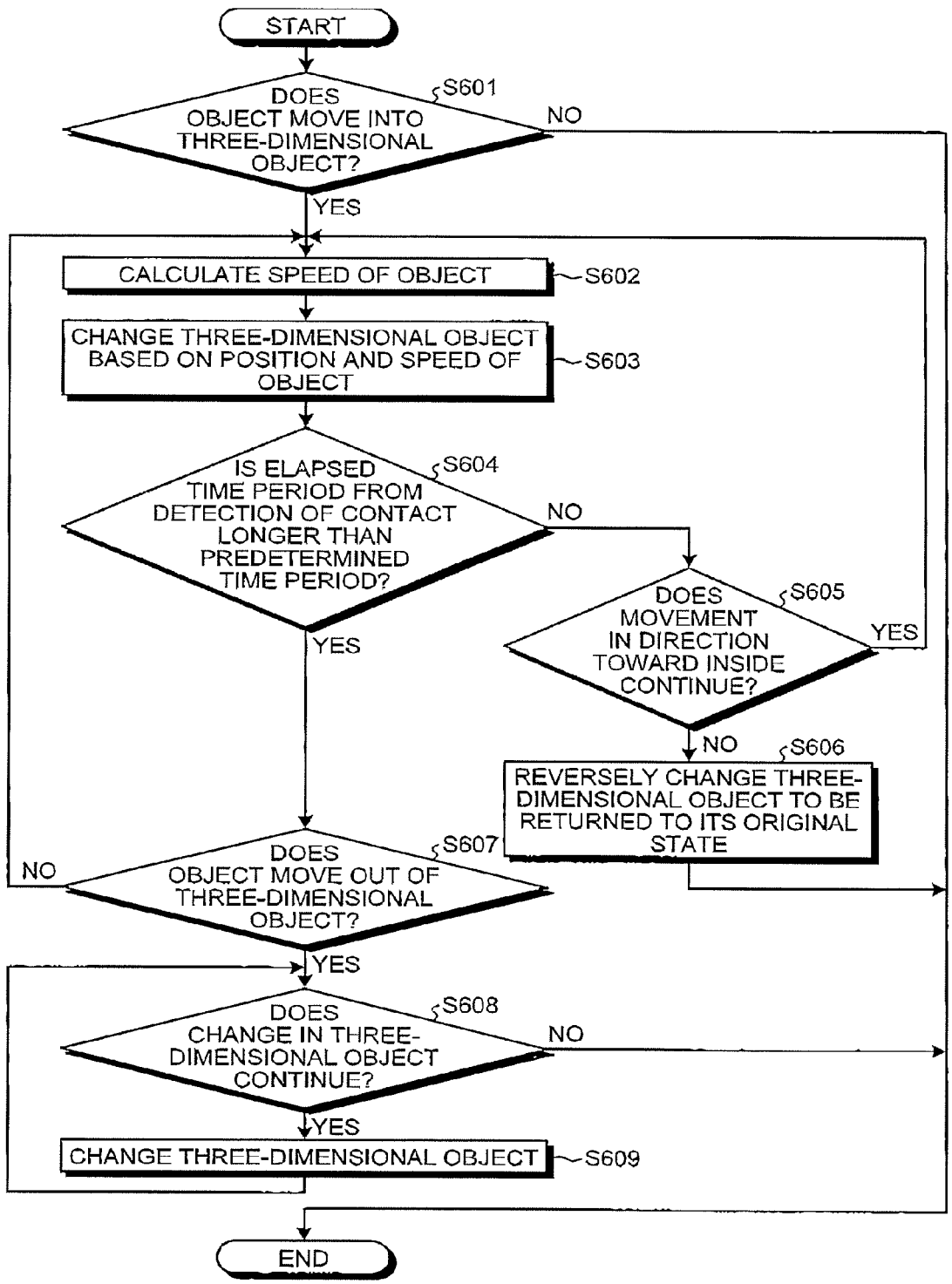
FIG. 26 is a flowchart illustrating a procedure of a detection process of operation of pushing.

When the three-dimensional object is not in the selected state or in the tentatively selected state (Step S504, No), the control unit 22 executes a detection process of the operation of pushing illustrated in FIG. 26 at Step S505. Thereafter, the control unit 22 executes Step S506.

FIG. 26 is a flowchart illustrating a procedure of the detection process of the operation of pushing. The procedure illustrated in FIG. 26 is realized by the execution of the control program 24a by the control unit 22. As illustrated in FIG. 26, the control unit 22 first judges whether the predetermined object moves into the three-dimensional object at Step S601. When the predetermined object does not move into the three-dimensional object (Step S601, No), the three-dimensional object is judged not to be the operational target, so that the control unit 22 finishes the detection process of the operation of pushing.

When the predetermined object moves into the three-dimensional object (Step S601, Yes), the control unit 22 calculates the speed of the predetermined object at Step S602. The control unit 22 changes the three-dimensional object based on a position and the speed of the predetermined object, and the like, at Step S603. Specific manner of the change is determined according to the action data 24c.

Subsequently, the control unit 22 judges whether a time period elapsed from the detection of the contact is longer than a predetermined time period at Step S604. When the elapsed time period is not longer than the predetermined time period, that is to say, when the three-dimensional object is not determined as the target of the operation of pushing (Step S604, No), the control unit 22 judges whether the movement of the predetermined object in a direction toward the inside of the three-dimensional object continues at Step S605.

When the movement in the direction toward the inside of the three-dimensional object continues (Step S605, Yes), the control unit 22 executes Step S602 and subsequent Steps again. When the movement in the direction toward the inside of the three-dimensional object does not continue (Step S605, No), the control unit 22 makes the reverse change to the three-dimensional object to return the three-dimensional object to its original state at Step S606. Then, the control unit 22 finishes the detection process of the operation of pushing.

When the elapsed time period from the detection of the contact is longer than the predetermined time period (Step S604, Yes), the control unit 22 judges whether the predetermined object moves out of the three-dimensional object at Step S607. When the predetermined object does not move out of the three-dimensional object, that is to say, when the operation of pushing continues (Step S607, No), the control unit 22 executes Step S602 and subsequent Steps again.

When the predetermined object moves out of the three-dimensional object, that is to say, when the three-dimensional object is released (Step S607, Yes), the control unit 22 judges whether the change in the three-dimensional object continues at Step S608. For example, when it is defined that vibration continues for a predetermined time period even after the release by the action data 24c, it is judged that the change in the three-dimensional object continues.

When the change in the three-dimensional object continues (Step S608, Yes), the control unit 22 changes the three-dimensional object at Step S609 and thereafter executes Step S608 and subsequent Steps again. When the change in the three-dimensional object does not continue (Step S608, No), the control unit 22 finishes the detection process of the operation of pushing.

Aspects of the present invention described in the above-described embodiment may be optionally modified without departing from the scope of the present invention. For example, the control program 24a described in the above-described embodiment may be divided into a plurality of modules or may be integrated with another program. Although the operation is performed by the hand and the finger for the three-dimensional object in the above-described embodiment, it is also possible to use a bar-shaped object and the like of which tip end is electrostatically charged in place of the hand and the finger.

Although a case in which the three-dimensional object projects on a side of the user is described in the above-described embodiment, the present invention may also be applied to a case in which the three-dimensional object seems to be present behind the display unit. In this case, the detecting unit may be arranged on a rear surface side of the display unit. When the display device is the mobile phone, it is often provided with a front camera for photographing the user and a rear camera for photographing a landscape and the like. Therefore, it is possible to capture displacement of the object on the rear surface side by using the rear camera.

Although the display device detects the operation for the three-dimensional object by itself in the above-described embodiment, it is also possible that the display device detects the operation for the three-dimensional object in cooperation with a server. In this case, the display device sequentially transmits the information detected by the detecting unit to the server and the server detects the operation to notify the display device of the detection result. Such a configuration may decrease a load on the display device.

Although an example in which the imaging unit is used as the detecting unit for detecting the object, which operates the three-dimensional object, is described in the above-described embodiment, the detecting unit is not limited thereto. For example, an infrared sensor (including a sensor using a TOF (time-of-flight) system) may be made the detecting unit in place of the imaging unit. Since non-contact detection of the displacement of the object is possible by arranging proximity sensors and the like, which may detect the movement in a surface direction in the three-dimensional space, substantially in line with the moving direction of the object, these sensors may be used naturally. It is preferable that the displacement of the object may be detected without arranging the sensor and the like on a side of the object, which operates the three-dimensional object. Without the arrangement of the sensor and the like on the side of the object, it is not required to attach the acceleration sensor to the hand and the finger or to move the display device itself provided with the acceleration sensor, so that it becomes possible to decrease a cost.

It is also possible to detect the object, which operates the three-dimensional object, by using the touch sensor. An example of utilizing the touch sensor as the detecting unit, which detects the object to operate the three-dimensional object, is hereinafter described. In a following description, a same reference sign as that of the already described portion is assigned to a portion similar to the already described portion. An overlapping description might be omitted.

Figure 27:
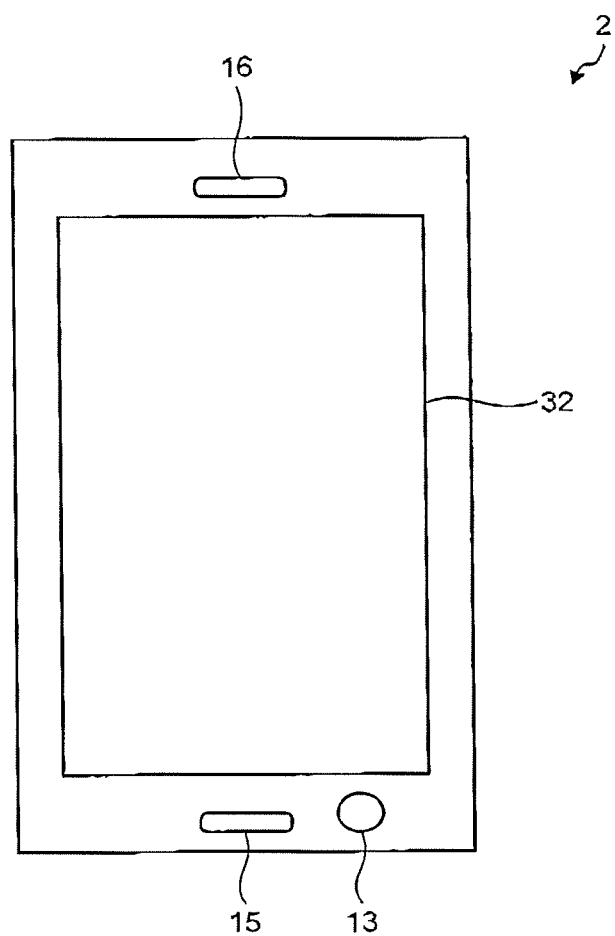
FIG. 27 is a front view of another mobile phone.
Figure 28:
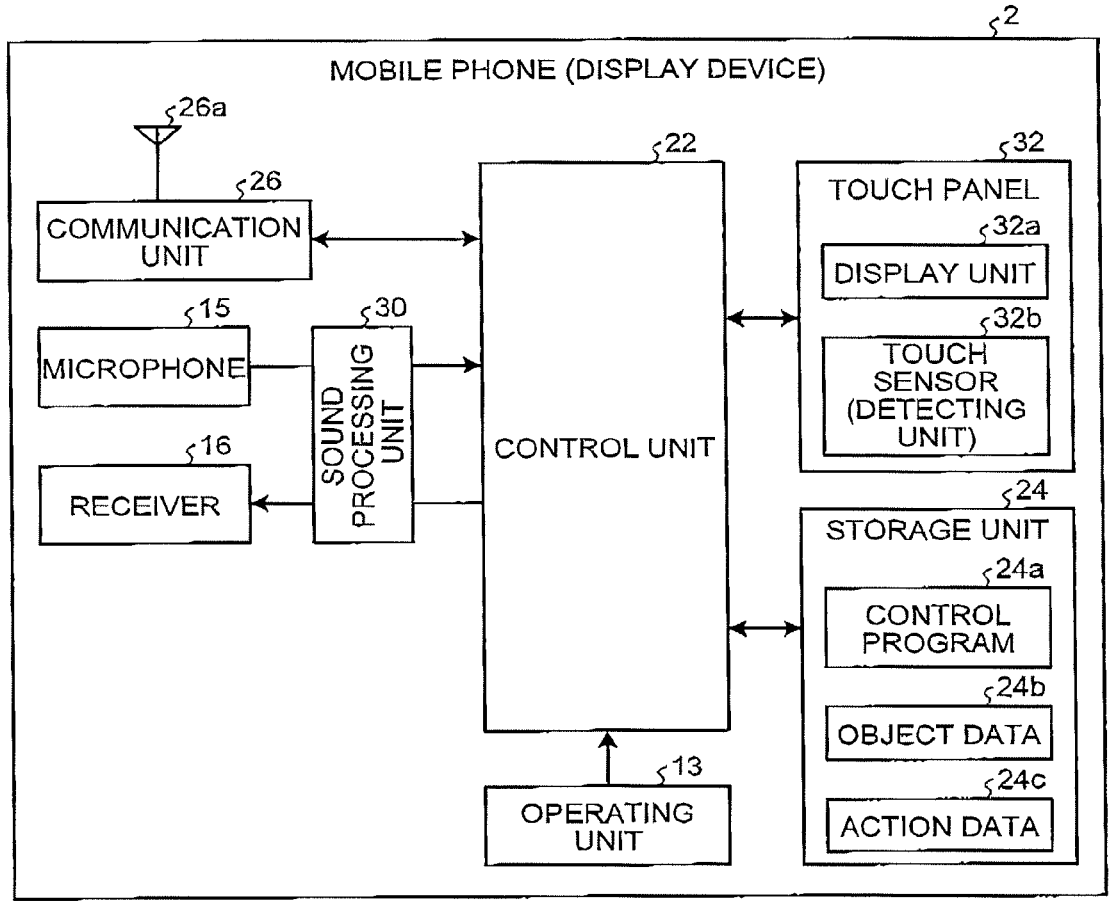
FIG. 28 is a block diagram of another mobile phone.

A configuration of a mobile phone (display device) 2 is described with reference to FIGS. 27 and 28. FIG. 27 is a front view of the mobile phone 2. FIG. 28 is a block diagram of the mobile phone 2.

As illustrated in FIGS. 27 and 28, the mobile phone 2 includes the operating unit 13, the microphone 15, the receiver 16, the control unit 22, the storage unit 24, the communication unit 26, the sound processing unit 30, and the touch panel 32.

The touch panel 32 displays the various pieces of information such as the character, the figure, and the image, and detects the input operation on the predetermined region such as the icon, the button, the character input region displayed. The touch panel 32 includes the display unit 32a and the touch sensor 32b overlapped with each other. In this embodiment, the touch sensor 32b is a capacitive type touch sensor. The touch sensor 32b also serves as the detecting unit, which detects the finger to operate the three-dimensional object.

Figure 29:
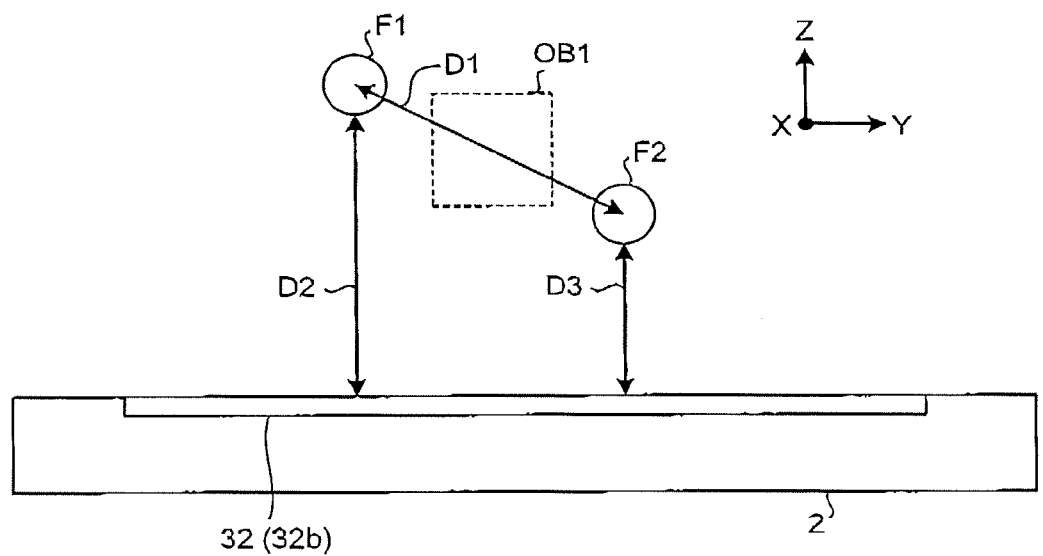
FIG. 29 is a diagram for explaining detection of operation for a three-dimensional object.

Then, the detection of the operation for the three-dimensional object is described with reference to FIG. 29. FIG. 29 is a diagram for explaining the detection of the operation for the three-dimensional object. In FIG. 29, the three-dimensional object OB1 is stereoscopically displayed in the three-dimensional space by the touch panel 32.

Herein, it is supposed that the user wants to perform certain operation for the three-dimensional object OB1. It is required to select the three-dimensional object OB1 as the operational target in order to perform the certain operation for the three-dimensional object OB1. In order to select the three-dimensional object OB1, the user moves the fingers F1 and F2 such that the three-dimensional object OB1 is located between the fingers F1 and F2 as illustrated in FIG. 29.

The mobile phone 2 detects the positions of the fingers F1 and F2 by using the touch sensor 32b. The touch sensor 32b may detect the positions of the fingers F1 and F2 in an x-axis direction and a y-axis direction even when distances between the fingers F1 and F2 and the surface of the touch panel 32 in a z-axis direction are approximately 10 cm, for example, by improving sensitivity thereof. The touch sensor 32b may detect a distance D2 between the finger F1 and the surface of the touch panel 32 in the z-axis direction and a distance D3 between the finger F2 and the surface of the touch panel 32 in the z-axis direction based on magnitude of the electrostatic capacitance.

The mobile phone 2 may calculate the distance D1 between the fingers F1 and F2 and judge whether the three-dimensional object is displayed between the fingers F1 and F2 based on the positions of the fingers F1 and F2 in the three-dimensional space detected in this manner. The control after it is detected that the three-dimensional object is displayed between the fingers F1 and F2 is executed according to the procedure described in any of the above-described embodiments.

As described above, the display device without the imaging unit may also detect the operation for the three-dimensional object by using the touch sensor as the detecting unit.

The imaging unit and the touch sensor may be used together for detecting the operation for the three-dimensional object. When the imaging unit and the touch sensor are used together, the positions of the fingers F1 and F2 may be specified by averaging detection results thereof. It is possible to use weighted average in which the detection result of the touch sensor is weighted in a region in the vicinity of the touch panel 32 because the imaging unit 40 acquires the image of the fingers F1 and F2 with difficulty, and in which the detection result of the imaging unit 40 is weighted in a region away from the touch panel 32 because detection accuracy of the touch sensor is deteriorated.

Figure 30:
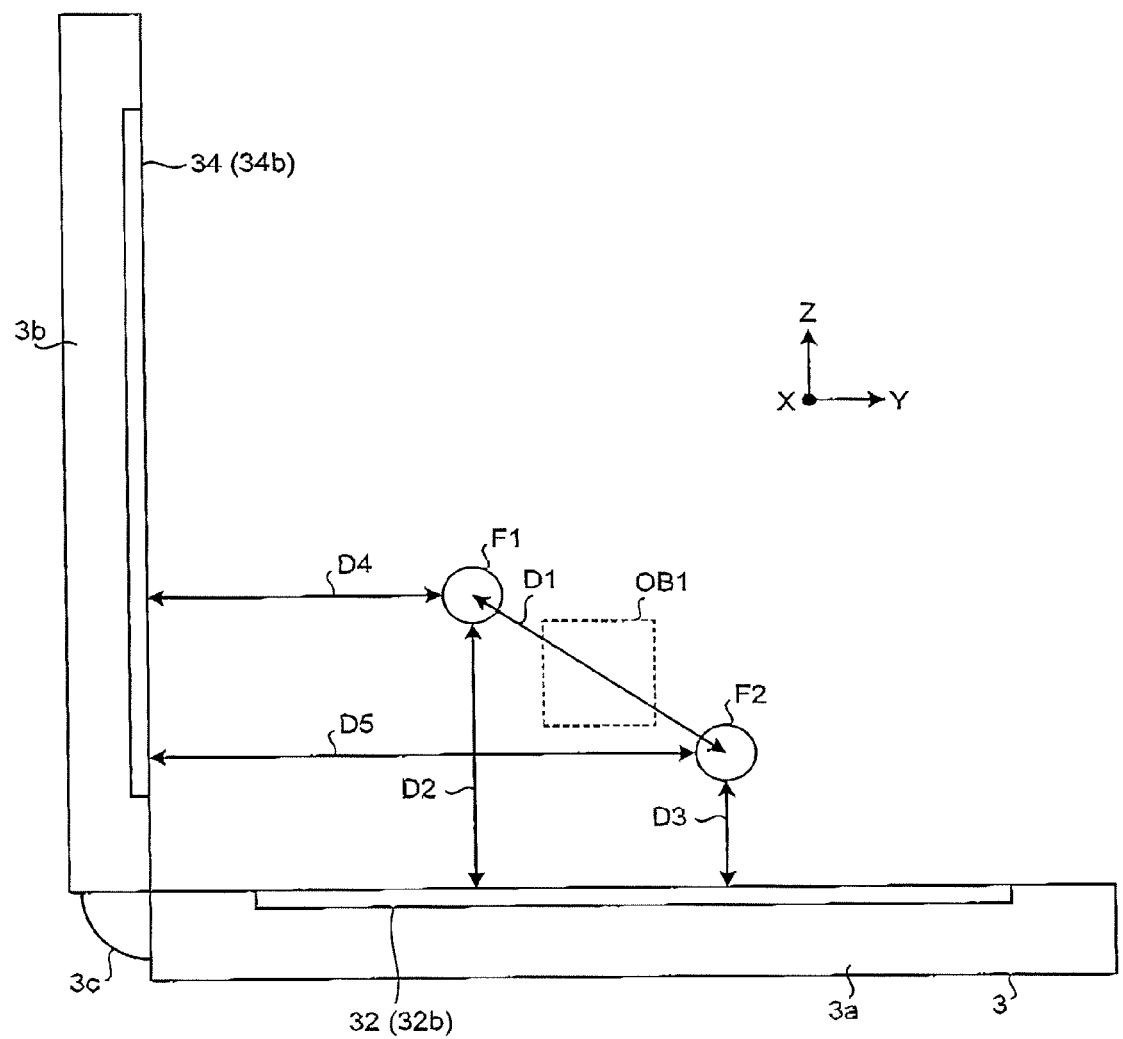
FIG. 30 is a diagram illustrating an example of a configuration of a mobile phone, which detects operation for a three-dimensional object by using a plurality of touch sensors.

It is also possible to detect the operation for the three-dimensional object by using a plurality of touch sensors so as to inhibit the detection with low accuracy of the position of the finger by the touch sensor due to the obstacle such as another finger. FIG. 30 is a diagram illustrating an example of a configuration of a mobile phone 3, which detects the operation for the three-dimensional object by using a plurality of touch sensors.

The mobile phone 3 includes a first housing 3a, a second housing 3b, and a hinge portion 3c. The hinge portion 3c connects the first housing 3a and the second housing 3b so as to be opened and closed. The first housing 3a is provided with the touch panel 32 including the touch sensor 32b, and the second housing 3b is provided with a touch panel 34 including a touch senor 34b. The touch sensors 32b and 34b are brought into contact with the three-dimensional space at different angles when the first and second housings 3a and 3b are fixed at an angle of approximately 90 degrees as illustrated in FIG. 30.

The touch sensor 32b may detect the positions of the fingers F1 and F2 in the x-axis direction and the y-axis direction. The touch sensor 32b may detect the distance D2 between the finger F1 and the surface of the touch panel 32 in the z-axis direction and the distance D3 between the finger F2 and the surface of the touch panel 32 in the z-axis direction based on the magnitude of the electrostatic capacitance.

The touch sensor 34b may detect the positions of the fingers F1 and F2 in the x-axis direction and the z-axis direction. The touch sensor 34b may detect a distance D4 between the finger F1 and a surface of the touch panel 34 in the y-axis direction and a distance D5 between the finger F2 and the surface of the touch panel 34 in the y-axis direction based on the magnitude of the electrostatic capacitance.

In this manner, by detecting the fingers F1 and F2 from different directions, it becomes possible to detect the positions of the fingers F1 and F2 from any direction even when there is a certain obstacle. When the fingers F1 and F2 are detected from different directions, it is possible that one touch panel displays the three-dimensional object and the other touch panel does not display or displays guidance and the like in two dimensions. The touch panel, which does not display the three-dimensional object, may be made a simple touch sensor.

The advantages are that one embodiment of the invention provides a display device, a control system, and a control program that can provide the user with convenient operations.

What is claimed is:

1. A display device, comprising:
   a display unit for stereoscopically displaying, in a virtual play space sectioned in a three-dimensional matrix pattern in a three-dimensional space, a three-dimensional block occupying one or a plurality of sections obtained by sectioning;

a control unit for controlling the display unit; and a detecting unit for detecting a position of an object in the three-dimensional space, wherein the control unit is configured to control the display unit
to allow the three-dimensional block to appear,
to allow the three-dimensional block to move in section unit based on a detection result when a change with time in the object in the three-dimensional space is detected by the detecting unit, and
to allow a portion of the three-dimensional block included in one layer to be deleted when all sections of the one layer of the play space is filled with the moved three-dimensional block.

2. The display device according to claim 1, wherein the control unit is configured to control such that another three-dimensional block appears a time period after one three-dimensional block appears.

3. The display device according to claim 2, wherein the control unit is configured to shorten the time period with time.

4. The display device according to claim 1, wherein the control unit is configured to control such that the three-dimensional block moves from a first surface of the play space toward a second surface opposed to the first surface with time.

5. The display device according to claim 4, wherein the control unit is configured to control not to move the three-dimensional block toward the first surface even when the detecting unit detects movement of the object from the second surface toward the first surface.

6. The display device according to claim 4, wherein the control unit is configured to control
not to move a first three-dimensional block, at least one of surfaces opposed to the second surface of which reaches the second surface, regardless of the detection result of the detecting unit, and
not to move a second three-dimensional block, at least one of the surfaces opposed to the second surface of which reaches the section in which the first three-dimensional block is present, regardless of the detection result of the detecting unit.

7. The display device according to claim 6, wherein the control unit is configured to allow the first three-dimensional block and the second three-dimensional block to move only under a predetermined condition.

8. The display device according to claim 7, wherein the control unit is configured
to allow the first three-dimensional block to move based on the detection result of the detecting unit when the detecting unit detects the movement of the object within a predetermined time period after at least one of the surfaces of the first three-dimensional block opposed to the second surface reaches the second surface, and
to allow the second three-dimensional block to move based on the detection result of the detecting unit when the detecting unit detects the movement of the object within the predetermined time period after at least one of the surfaces of the second three-dimensional block opposed to the second surface reaches the section in which the first three-dimensional block is present.

9. The display device according to claim 7, further comprising:
a second detecting unit for measuring acceleration applied to the display device itself or movement thereof, wherein
the control unit is configured to make detection of predetermined acceleration or movement by the second detecting unit the predetermined condition.

10. The display device according to claim 9, wherein the control unit is configured to rotate the play space based on a detection result of the second detecting unit.

11. The display device according to claim 10, wherein the control unit is configured not to rotate the three-dimensional block in motion when rotating the play space.

12. The display device according to claim 10, wherein the control unit is configured to change a surface in the vicinity of which the three-dimensional block appears when rotating the play space in a direction perpendicular to a display surface of the display unit.

13. The display device according to claim 12, wherein the control unit is configured to move all three-dimensional blocks in the play space toward a surface of the play space adjacent to the display surface after rotating the play space in the direction perpendicular to the display surface of the display unit.

14. The display device according to claim 12, wherein the control unit is configured to separate the three-dimensional block, controlled not to move out of all three-dimensional blocks in the play space, into sections to move toward a surface of the play space adjacent to the display surface after rotating the play space in the direction perpendicular to the display surface of the display unit.

15. The display device according to claim 1, wherein the detecting unit is configured to detect operation of the object to grasp the three-dimensional block, and
the control unit is configured to move the three-dimensional block by the number of sections corresponding to an amount of movement of the object, which continues the operation to grasp, or to rotate the three-dimensional block by an angle corresponding to a rotational amount of the object.

16. The display device according to claim 15, wherein the detecting unit is configured to detect the operation of objects to grasp the three-dimensional block at a plurality of sites, and
the control unit is configured to deform the three-dimensional block or to separate the three-dimensional block into a plurality of new three-dimensional blocks according to the movement or rotation of the objects, which grasp the three-dimensional block at the sites.

17. The display device according to claim 1, wherein the detecting unit is configured to detect the operation of the object to push the three-dimensional block, and
the control unit is configured to move the three-dimensional block by the number of sections corresponding to the amount of the movement of the object in the operation to push.

18. The display device according to claim 1, wherein the detecting unit is an imaging unit or an infrared sensor, which detects a shape of the object and a change of the object with time in the three-dimensional space.

19. A control system, comprising:
a terminal including
a display unit for stereoscopically displaying, in a virtual play space sectioned in a three-dimensional matrix pattern in a three-dimensional space, a three-dimensional block occupying one or a plurality of sections obtained by sectioning, and a detecting unit for detecting a position of an object in the three-dimensional space; and a control unit for controlling the terminal, wherein the control unit is configured to control the display unit to allow the three-dimensional block to appear, to allow the three-dimensional block to move in section unit based on a detection result when a change with time in the object in the three-dimensional space is detected by the detecting unit, and to allow a portion of the three-dimensional block included in one layer to be deleted when all sections of the one layer of the play space are filled with the moved three-dimensional block.

20. A non-transitory storage medium that stores a control program for causing, when executed by a display device including a display unit and a detecting unit, the display device to execute:

stereoscopically displaying, in a virtual play space sectioned in a three-dimensional matrix pattern in a three-dimensional space, a three-dimensional block occupying one or a plurality of sections obtained by sectioning by the display unit;

detecting a position of an object in the three-dimensional space by the detecting unit;

moving three three-dimensional block in section unit when a change with time in the object in the three-dimensional space is detected by the detecting unit; and deleting a portion of the three-dimensional block included in one layer when all sections of the one layer of the play space are filled with the moved three-dimensional block.

* * * * *